(12) United States Patent
Ide et al.

(10) Patent No.: US 9,304,358 B2
(45) Date of Patent: Apr. 5, 2016

(54) LIQUID CRYSTAL DEVICE AND METHOD OF MANUFACTURING LIQUID CRYSTAL DEVICE

(75) Inventors: Masafumi Ide, Tokorozawa (JP); Takaaki Nozaki, Iruma (JP); Takaaki Takeishi, Tokorozawa (JP); Kenichiro Kimura, Iruma (JP); Kaoru Yoda, Nagano (JP)

(73) Assignee: CITIZEN HOLDINGS CO., LTD., Tokyo (JP)

( * ) Notice: Subject to any disclaimer, the term of this patent is extended or adjusted under 35 U.S.C. 154(b) by 373 days.

(21) Appl. No.: 13/583,609

(22) PCT Filed: Mar. 10, 2011

(86) PCT No.: PCT/JP2011/056317
§ 371 (c)(1),
(2), (4) Date: Nov. 19, 2012

(87) PCT Pub. No.: WO2011/111869
PCT Pub. Date: Sep. 15, 2011

(65) Prior Publication Data
US 2013/0070192 A1 Mar. 21, 2013

(30) Foreign Application Priority Data
Mar. 10, 2010 (JP) ................................ 2010-053054

(51) Int. Cl.
*G02F 1/1339* (2006.01)
(52) U.S. Cl.
CPC .................... *G02F 1/1339* (2013.01)
(58) Field of Classification Search
CPC ............................ G02F 1/1339; G02F 1/1341
See application file for complete search history.

(56) References Cited

U.S. PATENT DOCUMENTS 6,122,033 A * 9/2000 Mathew et al. ............... 349/155
7,784,670 B2 8/2010 Suga et al.
(Continued)

FOREIGN PATENT DOCUMENTS

| JP | 11-133446 | 5/1999 |
| JP | 2005-311298 | 11/2005 |
| JP | 2006-518879 | 8/2006 |

(Continued)

OTHER PUBLICATIONS

International Search Report from the Japanese Patent Office, mailed May 24, 2011, for International Application No. PCT/JP2011/056317.
Office Action from the Japanese Patent Office, dated Nov. 25, 2015, for corresponding Japanese Patent Application No. 2012-504557.

*Primary Examiner* — Jessica M Merlin
(74) *Attorney, Agent, or Firm* — Finnegan, Henderson, Farabow, Garrett & Dunner, L.L.P.

(57) ABSTRACT

To provide a liquid crystal device and a method of manufacturing the liquid crystal device which has high durability in an environment of high temperature and high humidity, and which can be applied to optical communication device. A liquid crystal device and a method of manufacturing the liquid crystal device includes a first substrate provided with a frame shaped seal region for encapsulating a liquid crystal layer, and a second substrate provided in opposition to the first substrate, wherein a gold frame shaped structure is provided in the seal region of the first substrate so as to be crushed and deformed to form metallic bond when superimposed and joined to the second substrate, and wherein a gold film is disposed in the portion of the second substrate opposed to the gold frame shaped structure so as to form metallic bond to the gold frame shaped structure.

8 Claims, 29 Drawing Sheets

(56) References Cited

U.S. PATENT DOCUMENTS

| | | | |
|---|---|---|---|
| 2004/0165131 A1* | 8/2004 | Anderson et al. | 349/123 |
| 2004/0165139 A1 | 8/2004 | Anderson et al. | |
| 2004/0174473 A1 | 9/2004 | Cavanaugh et al. | |
| 2008/0245843 A1* | 10/2008 | Suga et al. | 228/3.1 |
| 2010/0109516 A1 | 5/2010 | Warashina et al. | |

FOREIGN PATENT DOCUMENTS

| | | | |
|---|---|---|---|
| JP | 2007-155989 | | 6/2007 |
| JP | 2008-16353 | | 1/2008 |
| JP | 2008016353 A | * | 1/2008 |
| JP | 2008-160655 | | 7/2008 |
| JP | 2008-251242 | | 10/2008 |

* cited by examiner (a)

ST11-11

(b)

ST11-12

(c)

ST11-13

(d)

ST11-14

(a)

(b)

(c)

(d)

(e)

(a) 
ST14-1

(b) 
ST14-2

(c) 
ST14-3

(a) ST24-1

(b) ST24-2

(c) ST24-3

(d) ST24-4

LIQUID CRYSTAL DEVICE AND METHOD OF MANUFACTURING LIQUID CRYSTAL DEVICE

TECHNICAL FIELD

The present invention relates to a liquid crystal device and a method of manufacturing liquid crystal device used in a liquid crystal display apparatus, a spatial light modulation apparatus, etc., and in particular, to a seal material for encapsulating and sealing liquid crystal in a liquid crystal device suitable for laser light control or optical communication used in optical manipulation or optical tweezers.

BACKGROUND

In a conventional liquid crystal device, a pair of substrates is bonded with resin, and liquid crystal is injected from an injection port into the space formed by the substrates and the resin, and then sealed to form a liquid crystal cell. Since, in the construction in which a liquid crystal layer is held between substrates with the resin as a seal material, the resin has no moisture proof property, water tends to permeate through it into liquid crystal layer. Also, the liquid crystal in contact with the seal material and the residual resin that is not polymerized at the time of hardening of the resin tends to co-solve in each other, especially at high temperature. Thus, the resin may elute in the liquid crystal layer, and may lead to the problem of degradation of the characteristics of the liquid crystal due to alignment defects of liquid crystal molecules, or deterioration of specific electrical resistivity, etc.

In particular, in a spatial light modulation devices used for optical communication, high durability in an environment of high temperature and high relative humidity is demanded. In MEMS, in order to incorporate liquid crystal device that has the advantage of no mechanical moving part, it is essential to improve durability of liquid crystal device in an environment of high temperature and high relative humidity. Thus, a liquid crystal device has been proposed which uses inorganic material as a seal material in place of resin (see Patent Document 1).

FIG. 32 is a view useful for explaining a conventional liquid crystal device.

As shown in FIG. 32, a liquid crystal device 600 comprises a liquid crystal layer 650 sandwiched between a pair of substrates 610, 620 disposed in opposition to each other. The device substrate 610 and the opposing substrate 620 are bonded at the seal portion of the upper surface 680a of the frame part 680 enclosing the liquid layer 650. The seal portion is formed by direct joining of the frame part 680 integrally formed on the inner surface of the opposing substrate 620 and the contact surface of the device substrate 610 opposed to the frame part 680 in vacuum after surface activation treatment.

Therefore, the frame part 680 forming the liquid crystal layer between substrates is formed not from conventional resin but of same inorganic material as the opposing substrate 620, and is directly joined to the device substrate 610 by surface activation treatment, so that it is of highly moisture proof and can prevent permeation of water into the liquid crystal layer. Thus, it is possible to provide a highly durable liquid crystal device that can prevent deterioration of liquid crystal characteristics.

FIG. 33 is a view useful for explaining other conventional liquid crystal device.

As shown in FIG. 33, it is possible to subject the device 710 and the lid 720 to surface activation treatment and to join them directly (see Patent Document 2). In order to join the device 710 and the lid 720, a gold soldering film 730 of 1 μm or greater in thickness is formed as joint part on the joining surface of the device 710. On the joining surface of the lid 720, a gold thin film 740 is formed by sputtering or flash soldering. The thick gold soldering film 730 and gold thin film 740 may be formed on the contrary surfaces. After surface activation treatment is performed on the gold surface of the device 710 and the lid 720 by etching with Ar plasma in a vacuum chamber of a wafer joining apparatus, the device 710 and the lid 720 are brought into contact with each other, and pressurized to achieve joining.

FIG. 34 is a view useful for explaining still another conventional liquid crystal device.

As shown in FIG. 34, a liquid crystal display apparatus is proposed in which two plates 810, 820 are disposed in opposition to each other, and are pressurized in reduced pressure with a frame member 830 sandwiched therebetween to join the two plates in air tight manner via the frame member 830 (see Patent Document 3). Two plates are assembled together by joining of the plate 820 and the frame member 830 joined with frit glass 831 in advance with an adhesive 840 disposed on the plate 820.

Also, before joining, surface activation treatment is performed on the surface of the frame member 830 and the adhesive 840. Although the frame member is constructed from glass, it may be constructed from metal.

PATENT LITERATURE

Patent Document 1: Japanese Unexamined Patent Application Publication No. 2007-155989 (Page 1; FIG. 2)
Patent Document 2: Japanese Unexamined Patent Application Publication No. 2005-311298 (Page 32; FIG. 29)
Patent Document 3: Japanese Unexamined Patent Application Publication No. 2008-16353 (FIG. 3; FIG. 4)

SUMMARY

The seal part of the liquid crystal device as shown in Patent Document 1 is formed in patterning by etching of one of the surface of liquid crystal substrate formed of quartz material so as to project from the surface of the substrate, and it is intended that two surfaces of hard material are joined by surface activation treatment. Therefore, joining surfaces of a pair of substrates have to be finished with precision of flatness and surface roughness on the order of nano-centimeter, and thus application in practice has been extremely difficult.

In the joining method as shown in Patent Document 2, a gold soldering film or a gold thin film is formed on the joining surface of the device or the lid, and after surface activation treatment is performed, two surfaces are pressurized in vacuum to be joined to each other. However, as in Patent Document 1, the joining method shown in Patent Document 2 also requires high precision in flatness of joining surfaces since, in joining of the surfaces over entire seal width, only those portions in contact can be joined. Further, a large joining load has to be applied in joining to induce deformation of the gold surface. It is intended only for joining, and sealing of liquid as in liquid crystal layer of a liquid crystal panel is not considered. Shape of the seal required for injection of liquid so as not to give rise to spilling is not disclosed. Also, manufacturing process is extremely complicated since the surfaces have to be pressurized in vacuum.

Joining method shown in Patent Document 3 utilizes an adhesive 840 in addition to surface activation treatment performed on the surface of the frame member. Thus, it is not easy to realize a liquid crystal device of high durability under an environment of high temperature and high humidity.

It is an object of the liquid crystal device and the method of manufacturing liquid crystal device according to the present invention to resolve these problems as described above.

It is an object of the liquid crystal device and the method of manufacturing liquid crystal device according to the present invention to provide a liquid crystal device that can be easily joined by pressurization in the atmosphere at normal temperature.

It is a further object of the liquid crystal device and the method of manufacturing liquid crystal device according to the present invention to provide a liquid crystal device having high durability in an environment of high temperature and high humidity.

Means for Solving the Problem

The liquid crystal device includes a first substrate provided with a frame shaped seal region for encapsulating a liquid crystal layer, and a second substrate provided in opposition to said first substrate wherein in said seal region of said first substrate, a gold frame shaped structure is provided so as to be crushed and deformed to form metallic bond when superimposed and joined to said second substrate, and wherein gold film is disposed in the portion of said second substrate opposed to said gold frame shaped structure to form metallic bond with said gold frame shaped structure.

In the liquid crystal device, the gold frame shaped structure has preferably at least plural gold wall shaped structures.

In the liquid crystal device, the gold frame shaped structure has preferably at least one gold wall shaped structure and gold pillar shaped structures.

In the liquid crystal device, the gold frame shaped structure has preferably plural recesses in the gold wall shaped structure.

In the liquid crystal device, there is an inorganic spacer material between the first substrate and the gold frame shaped structure, or between the second substrate and the gold film.

In the liquid crystal device, the inorganic spacer material is preferably a dielectric film or a metal film.

The method of manufacturing a liquid crystal device including a first substrate, a second substrate, a seal material, and a liquid crystal layer encapsulated by said first substrate, said second substrate and said seal material, the method includes the steps of forming a gold frame shaped structure as a first seal material on said first substrate, forming a gold film as a second seal material on said second substrate, subjecting the surface of said gold frame shaped structure and the surface of said gold film to surface activation treatment, and forming said seal material so as to join said first seal material to said second seal material by pressurizing at normal temperature said surface of the gold frame shaped structure having been subjected to the surface activation treatment and said surface of the gold film having been subjected to the surface activation treatment to form metallic bond between them.

In the method of manufacturing liquid crystal device, the gold frame shaped structure preferably has gold wall shaped structures.

In the method of manufacturing liquid crystal device, the step of forming a gold frame shaped structure preferably comprises the step of disposing an inorganic spacer material and a gold film on the first substrate.

In the method of manufacturing liquid crystal device, the gold frame shaped structure is preferably formed by half-etching of the disposed gold film.

In the method of manufacturing liquid crystal device, the step of forming a gold film on the second substrate preferably comprises the step of disposing a second inorganic spacer material on the second substrate.

In the method of manufacturing liquid crystal device, it is preferable that the first substrate is a glass substrate and the second substrate is a silicon substrate or a glass substrate.

In the method of manufacturing liquid crystal device, the surface activation treatment preferably comprises the step of activating the surface of the gold frame shaped structure and the surface of the gold film by irradiation of plasma or ion beam.

In the method of manufacturing liquid crystal device, the method preferably further comprises the step of forming an alignment film on the first substrate or on said second substrate.

In the method of manufacturing liquid crystal device, it is preferable that, in order to form a gold frame shaped structure, unnecessary portion of the gold film disposed on the first substrate is removed by lift-off.

Substrates for liquid crystal device are a pair of substrates for liquid crystal device includes frame shaped seal regions for encapsulating a liquid crystal layer, and wherein, in the pair of substrates, the seal region in one substrate has a gold frame shaped structure disposed thereon for being crushed and deformed to form metallic bond when superimposed on and joined to the other substrate, and the seal region in the other substrate has a gold film disposed thereon for forming metallic bond with the gold frame shaped structure.

The gold frame shaped structure has at least a plurality of gold wall shaped structures. Also, the gold frame shaped structure has at least one gold wall shaped structure and one gold pillar shaped structures. Also, the gold frame shaped structure has plural recesses in the gold wall shaped structure. Further, an inorganic spacer material is provided between one substrate and the gold frame shaped structure, or between the other substrate and the gold film. The inorganic spacer material is preferably a dielectric film, or a metal film.

The method of manufacturing liquid crystal device is a manufacturing method of liquid crystal device in which a pair of substrates is stuck to each other via the seal material containing gold provided in the seal regions and a liquid crystal layer is encapsulated in the space between them, includes a first seal material forming process of forming a gold frame shaped structure as a first seal material in the seal region on a first substrate as one of the pair of substrates, a second seal material forming process of forming a gold film in the seal region on a second substrate as the other of the pair of substrates, a surface activation treatment step of performing surface activation treatment on the gold surface of the gold frame shaped structure of the first seal material and gold surface of the gold film of the second seal material, and a pressurized joining step of bringing the gold surfaces of the first seal material and the second seal material in contact with each other and pressurizing them at normal temperature to join them in metallic bond. Also, the gold frame shaped structure has gold wall shaped structures.

In the method of manufacturing liquid crystal device, the first seal material forming process preferably includes a first spacer forming step of disposing an inorganic spacer material and a gold film on the first substrate before the step of forming a gold frame shaped structure.

In the method of manufacturing liquid crystal device, the step of forming a gold frame shaped structure preferably includes a micro-bump forming step of half-etching the gold film disposed in the first spacer forming step to form micro bumps.

In the method of manufacturing liquid crystal device, the second seal material forming process preferably includes a second spacer forming step of disposing a second inorganic spacer material before the step of forming gold film disposed in the second seal material forming process.

In the method of manufacturing liquid crystal device, it is preferable that the first substrate is a glass substrate and the second substrate is a silicon substrate or a glass substrate.

In the method of manufacturing liquid crystal device, the surface activation treatment step preferably includes a step of activating the gold surface with irradiation of plasma or ion beam.

In accordance with the liquid crystal device and the method of manufacturing liquid crystal device according to the present invention, it is possible to provide a liquid crystal device that can achieve secure seal and water proof property.

In accordance with the liquid crystal device and the method of manufacturing liquid crystal device according to the present invention, it is possible to provide a liquid crystal device having high durability in an environment of high temperature and high humidity.

BRIEF DESCRIPTION OF THE DRAWING

FIG. 6($b$) is a partial enlarged perspective view showing the seal material of another liquid crystal device 2;

FIG. 7($b$) is a partial enlarged perspective view showing the seal material of another liquid crystal device 3;

FIG. 8($b$) is a partial enlarged perspective view showing the seal material of another liquid crystal device 4;

DESCRIPTION EMBODIMENTS

Now, the liquid crystal device and the method of manufacturing liquid crystal device of the present invention will be described with reference to drawings. It is to be understood that the technical scope of the invention is not limited to these embodiments, but is only defined by the appended claims and equivalent of the present invention.

Seal material is formed by surface activation treatment of the gold film and the gold structure and by forming metallic bond under atmosphere at normal temperature. The smaller the contact area of the gold film and the gold structure, the more secure and reliable bond can be formed. Therefore, as the gold structure, the minimum pillar shaped structure, such as so-called bump shape, etc., is preferable. However, when seal material is constructed only from bump shaped structure, the liquid crystal layer may leak from between bumps and it is difficult to seal the liquid crystal layer inside the seal material. Thus, the shape of gold frame shaped structure and the method of manufacturing the liquid crystal device of the invention described below are such that it is possible to form secure metallic bond and to seal the liquid crystal layer completely.

In the description that follows, the case of a reflective type liquid crystal device, so-called LCOS (liquid crystal on silicon), is taken as an example where one of the substrates is a silicon substrate and the other is a glass substrate, and a liquid crystal layer is formed between the pair of substrates, and CMOS circuit such as driving circuit is formed on the silicon substrate.

FIGS. 1 to 5 are views useful for explaining the construction of a liquid crystal device 1.

Figure 1:
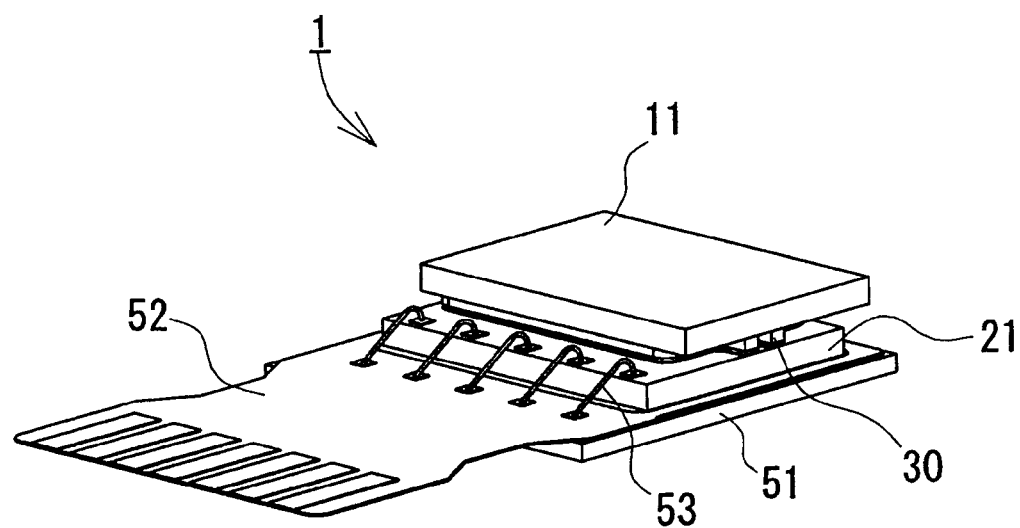
FIG. 1 is a perspective view showing external appearance of a liquid crystal device 1.
Figure 2:
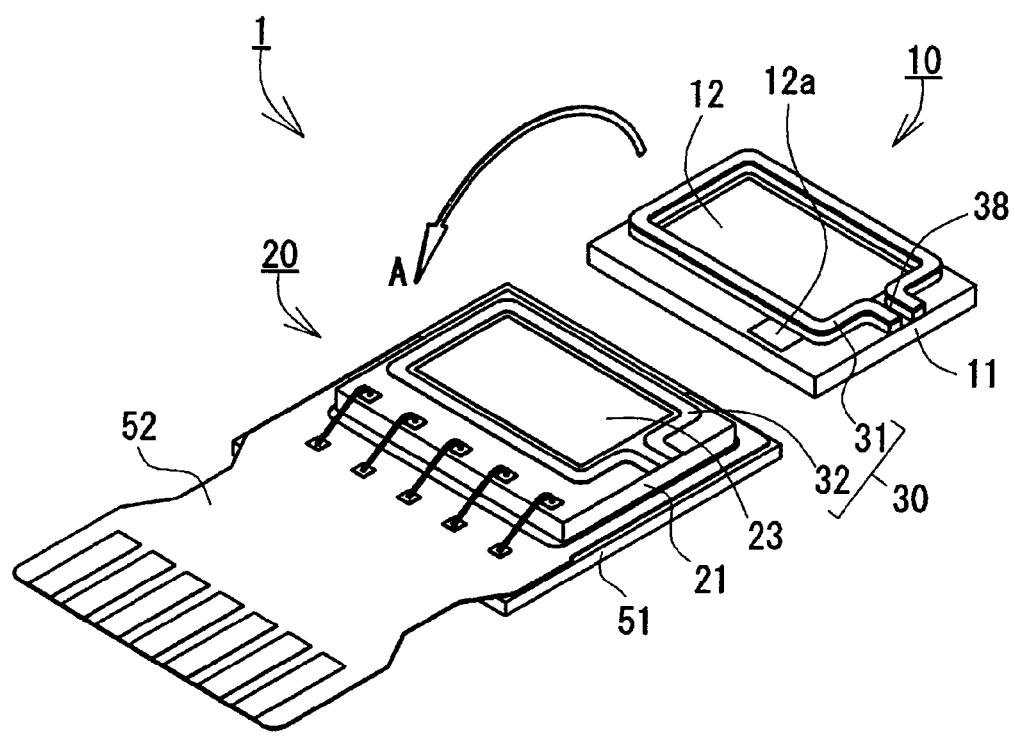
FIG. 2 is a partial exploded perspective view showing the construction of the liquid crystal device 1 shown in FIG. 1.
Figure 3:
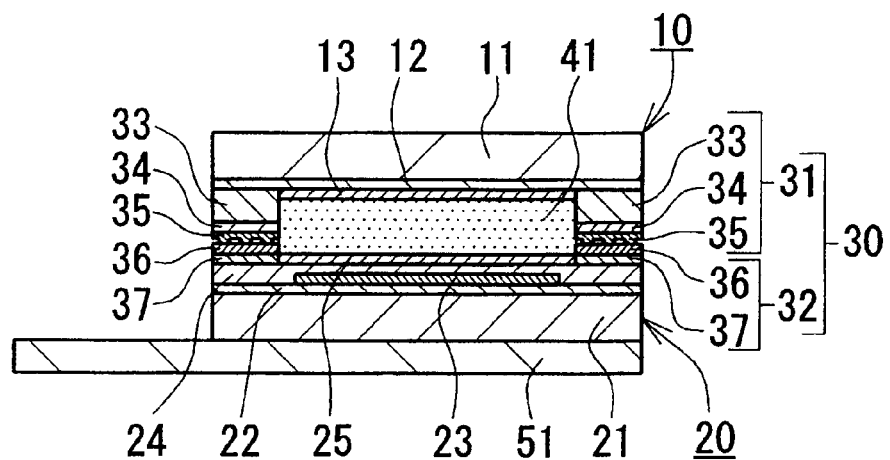
FIG. 3 is a schematic sectional view showing the liquid crystal device 1 shown in FIG. 1.
Figure 4:
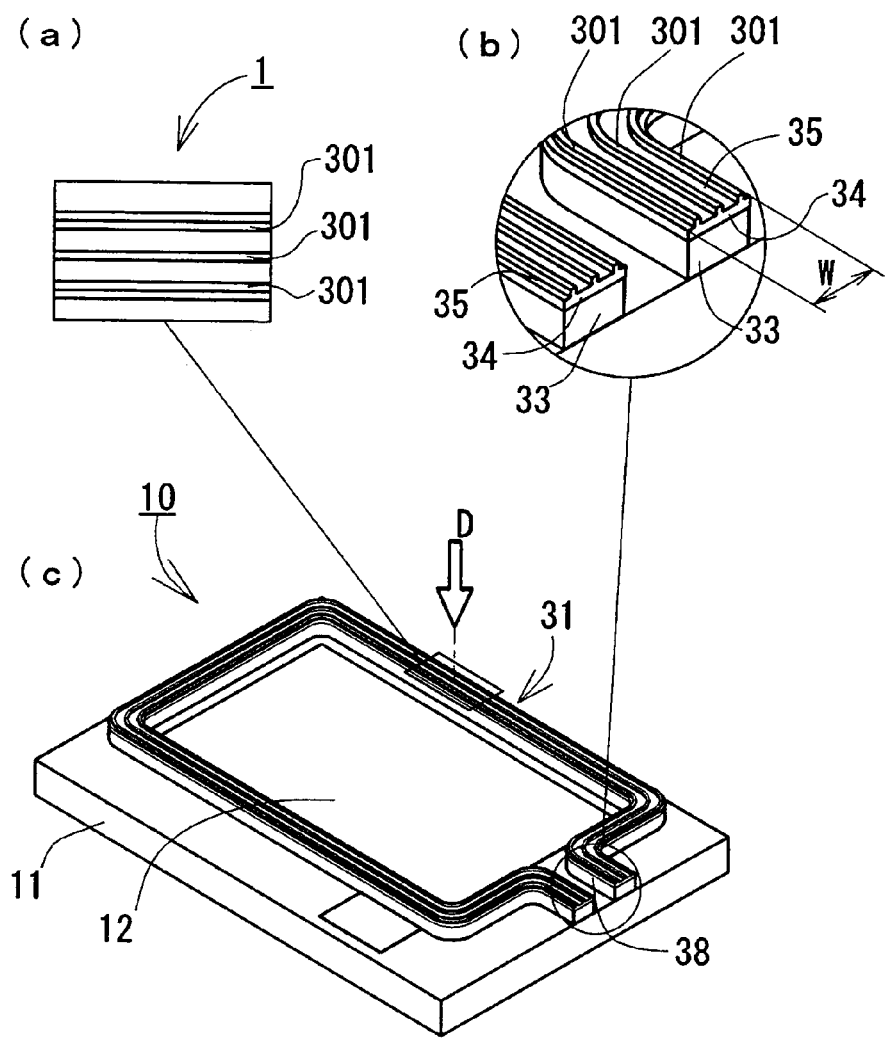
FIG. 4($a$) is a sectional view showing the seal material of the liquid crystal device 1 shown in FIG. 1, FIG. 4($b$) is a partial enlarged perspective view showing the seal material of the liquid crystal device 1 shown in FIG. 1, and FIG. 4($c$) is a perspective view showing the seal material of the liquid crystal device 1 shown in FIG. 1.
Figure 5:
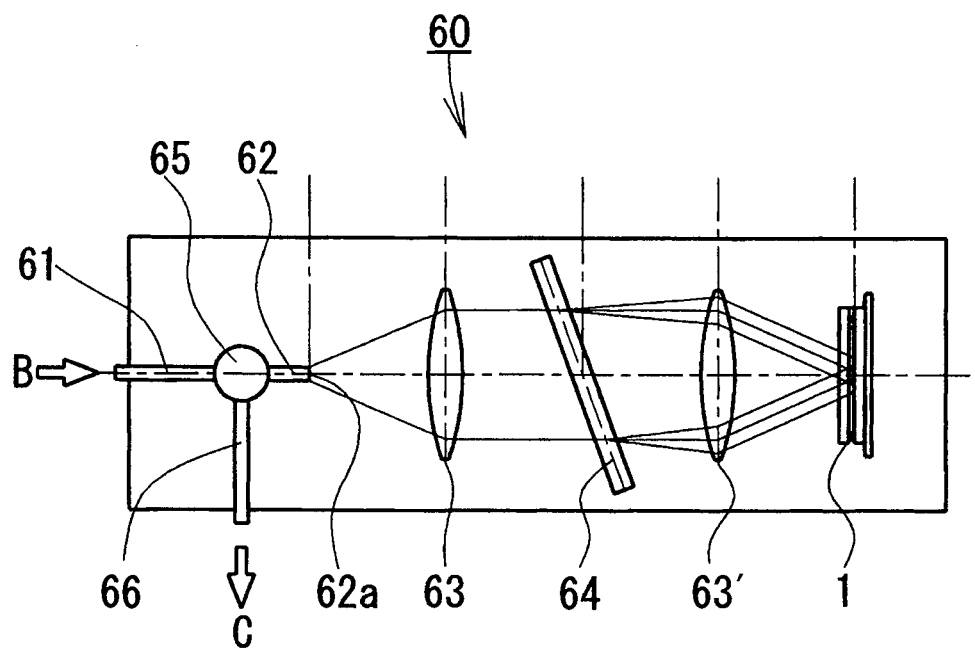
FIG. 5 is a schematic view showing the construction of a spatial light modulator to which the liquid crystal device 1 shown in FIG. 1 is incorporated.

FIG. 1 is a perspective view showing external appearance of a liquid crystal device 1, FIG. 2 is a partial exploded perspective view showing the construction of the liquid crystal device 1, FIG. 3 is a schematic longitudinal sectional view showing a section of the liquid crystal device 1, FIG. 4 is a perspective view useful for explaining the construction of the seal material formed on the first substrate and the structure of the gold surface formed on the seal material, and FIG. 5 is a schematic view showing the construction of a spatial light modulator (for example, a dynamic equalizer) having the liquid crystal device 1 incorporated therein.

Referring to FIGS. 1 to 4, the overall construction of the liquid crystal device 1 will be described. In the drawings, same constituents are denoted by same reference numerals throughout, and duplicated description thereof is omitted.

As shown in FIG. 1, the liquid crystal device 1 has the construction in which a liquid crystal layer is formed by a seal material 30 between a pair of substrates, that is, between a first substrate 11 formed as a glass substrate and a second substrate 21 formed as a silicon substrate. On a liquid crystal device base 51 formed of a material such as an alloy having a small thermal expansion coefficient, the second substrate 21 and FPC 52 are positioned and fixed with resin or the like so as to absorb thermal deformation due to difference of thermal expansion coefficient between the liquid crystal device base 51 and the second substrate 21. The second substrate 21 having CMOS circuit such as a driving circuit formed thereon is electrically connected to FPC 52 with the bonding wire 53, and the liquid crystal layer is driven by a signal from a control circuit (not shown).

In FIG. 1, for convenience, the bonding wires 53 and the electrodes on FPC 52 are shown fewer in number, but the number may be several tens or more depending on the size of the circuit shown on the substrate 21 or the number of wiring of the temperature sensor or other parts mounted on the liquid crystal device base 51. The bonding wires 53 are usually covered and protected with an epoxy-based adhesive, which is not described in the drawing for convenience.

The partial exploded perspective view of FIG. 2 is a view useful for explaining the seal material 30 of the liquid crystal device 1, and is shown with the first substrate body 10 opened and broken upside down from the second substrate body 20. The first substrate body 10 is composed of the first substrate 11 and the first seal material 31, and the second substrate body 20 is composed of the second substrate 21 and the second seal material 32. The liquid crystal device 1 is assembled by superimposing the first substrate body 10 in the direction of the arrow A on the second substrate body 20 to form the liquid crystal device 1.

The seal material 30 (see FIG. 1) is, as shown in FIG. 2, composed by joining the first seal material 31 formed on the first substrate 11 to the second seal material 32 formed on the second substrate 21.

The seal region of the first substrate 11 is formed around an opposing electrode 12 consisting of a transparent electrode (hereinafter denoted as ITO), and the first seal material 31 is formed on the seal region to form the gold frame shaped structure. On one side of the seal material 31, an injection port 38 for injecting liquid crystal is formed, and is sealed, after injection of liquid crystal, with seal material of conventional resin. The terminal 12a of the opposing electrode 12 is formed so as to be extended outside the first seal material 31 and to be electrically connected to the electrode (not shown) extended from FPC 52 with silver paste or the like.

The seal region of the second seal material 32 is formed, for example, around the pixel electrode 23 consisting of aluminum electrode on the second substrate 21, and on the seal region, the second seal material 32 is formed. The planar shape of the second seal material is formed identical to the planar shape of the first seal material 31, so that the gold thick film on the upper surface of the first seal material 31 and the gold thin film on the upper surface of the second seal material 32 to be described later are formed so as to coincide in shape and to be superimposed and sealed to each other.

Using the sectional view shown in FIG. 3, the structure of the liquid crystal device 1 will be described in further detail.

In FIG. 3, bonding wire 53 and FPC 52 are omitted. The second substrate 21 consisting of a silicon substrate comprises a layer having CMOS circuit 22 formed thereon (composed of a multilayer wiring part and metal plugs and the like connecting the wiring layer), aluminum electrodes forming pixel electrodes 23, and a passivation film 24 for protecting them. In the seal region on the upper surface of the second substrate 21, Ti film 37 and a gold film 36 are coated as the second seal material 32. The Ti film 37 as the inorganic spacer is formed to enhance adhesive strength between the gold film 36 and the silicon substrate. Inside the second seal material 32, on the second substrate body 20, a second alignment film 25 consisting of $SiO_2$ is coated by oblique vacuum deposition.

In FIG. 3, an example in which the second seal material 32 is formed on the passivation film 24 is shown. The construction in which the first seal material is formed from metal material and is used as wiring may be adopted. In that case, after connection part of the pixel electrode 23 and the second seal material is formed, partial etching may be performed to form opening part and the second seal material 32 may be formed in the opening part.

The first substrate 11 formed as a glass substrate has ITO formed on the surface opposing to the second substrate 21 as an opposing electrode to the pixel electrode 23 of the second substrate 21. In a glass substrate used in an optical system, in particular, a refractive index matching film is formed between the glass substrate and ITO, and AR coat is formed on the side opposite to ITO, but these are omitted in FIG. 3.

The first seal material 31 formed in the seal region of the first substrate 11 consists of an inorganic spacer material 33 formed from a dielectric film of $SiO_2$, a Ti film 34, and a gold thick film 35. Ti film 34 is coated, as the second seal material 32, with the purpose of increasing adhesive strength between the gold film 35 and the inorganic spacer material 33. $SiO_2$ layer and Ti film 34 as a metal layer may be collectively considered as an inorganic spacer material. Further, inside of the first seal material 31, the first alignment film 13 of $SiO_2$ is formed by oblique deposition on the first substrate body 10.

Surface activation treatment with ion beam irradiation or plasma treatment is performed on the gold thick film 35 of the seal material of the first substrate body 10 and the gold thin film 36 of the seal material 32 of the second substrate body 20. Thereafter, the surface of the gold thick film 35 of the seal material of the first substrate and the surface of the gold thin film 36 of the seal material 32 of the second substrate are superimposed to each other in the atmosphere at normal temperature, and by pressurizing the gold surfaces to each other so as to be slightly deformed, the gold atoms are securely joined in metallic bond.

Thus, in order to facilitate the gold to be deformed by the pressurization at the time of joining, deformable gold structure is formed in advance as the gold thick film 35 of the seal material 31 of the first substrate 11, so that it is possible to form the liquid crystal device 1 which enables secure seal to be established with the seal materials of the first substrate 11 and the second substrate 21. Thereafter, liquid crystal is injected through the injection port 38 (see FIG. 2), and the injection port 38 is sealed by a seal material to form the liquid crystal layer 41. The liquid crystal of the liquid crystal device 1 adopts vertical alignment of negative type nematic liquid crystal. Since, as described above, the seal material is formed from an inorganic material, it is possible to provide the liquid crystal device 1 having high durability at an environment of high temperature and high humidity.

Unlike organic material, the inorganic spacer material formed from $SiO_2$ (or, inorganic spacer material including the $SiO_2$ layer and a metal layer of Ti film 34) does not allow permeation of moisture that is harmful to the liquid crystal. Thus, it has excellent function of preventing water from giving rise to chemical reaction with the liquid crystal and producing impurity ions. Also, it has suitable hardness such that, unlike organic seal, addition of gap material is not required, and the cell gap of the liquid crystal cell can be controlled only with the inorganic spacer.

FIG. 4 is a schematic view useful for explaining the detail of the seal material 31 formed on the first substrate 11. FIG. 4(c) is an enlarged perspective view showing the first substrate body 10 shown in the perspective view of FIG. 2, FIG. 4(a) is a partial enlarged plan view showing the seal material 31 useful for explaining the structure of the gold thick film 35 as seen from the direction of arrow D, and FIG. 4(b) is a partial enlarged perspective view showing the vicinity of the injection port 38 of the seal material 31 useful for explaining the structure of the gold thick film 35.

In FIG. 4(c), as has been described with reference to FIG. 2, the seal material 31 is formed in the seal region that has been set around the opposing electrode 12 on the first substrate 11, and the injection port 38 of the liquid crystal is formed on one of the four sides.

As shown in FIG. 4(a), the width of the seal material 31 is, for example, about 200 μm. The wall shaped structure 301 in three narrow bands formed on the gold thick film 35 as the frame shaped structure is, for example, of 0.5-2 μm in height and 2-50 μm in width, being formed around on the entire seal material 31 as micro-bump in broad sense. Even if a pin-point defect is formed in one innermost wall shaped structure 301, two other wall shaped structures 301 on the outside can ensure the tightness of the seal.

As shown in FIG. 4(b), the seal material 31 consists of the inorganic spacer material 33, Ti film 34, and the gold thick film 35 formed in approximately same width W. The inorganic spacer material 33 consisting of $SiO_2$ is formed at the cell gap of the liquid crystal layer of 3 to 10 μm in height. Ti film 34 is formed to increase the adhesion of $SiO_2$ to the gold film. The gold thick film 35 has half-etched frame shaped structure 301 formed on the surface thereof. The wall shaped structure 301 is joined by promoting the metallic bond of gold atoms in crushing and deformation by the load applied in joining to the gold thin film of the second substrate so as to seal the liquid crystal layer.

Since plural wall shaped structures 301 are formed in the gold thick film 35 of the seal material 31 of the first substrate 11, the wall shaped structures 301 are easily crushed and deformed by the pressurization at the time of joining in the atmosphere at normal temperature. Therefore, even if there are small ruggedness and irregularities in flatness of the wall shaped structures 301, these irregularities can be absorbed in crushing and deformation, and secure joint can be formed. Depending on the external shape and size, and the force of pressurization, the number and width of the wall shaped structures may be varied to adjust the crushability and deformability. For example, the number of the wall shaped structures 301 may be two.

The first substrate body 10 having the seal material 31 formed thereon and the second substrate body 20 are joined with the gold subjected to the surface activation treatment. Since the liquid crystal device 1 formed with the liquid crystal layer has the seal material 31 formed from inorganic material, permeation of water into liquid crystal layer can be prevented, and co-solution of the seal material and the liquid crystal does not occur. Therefore, deterioration of the characteristics of the liquid crystal can be suppressed, and it is possible to provide a highly durable liquid crystal device 1 that can be applied to optical communication.

The construction and operation of a spatial light modulator 60 (dynamic gain equalizer) used in optical communication that incorporates the liquid crystal device 1 will be described with reference to FIG. 5.

First, basic construction of a dynamic gain equalizer 60 will be described.

As shown in FIG. 5, the dynamic gain equalizer 60 is composed of a 4f optical system, including an optical fiber 61 consisting of a polarization maintaining fiber transmitting the incident light, a circulator 65 that separates incident light and exit light, a PM fiber 62 (polarization maintaining fiber) that transmits the incident linear polarization as linear polarization, etc.

In the dynamic equalizer 60, separation between the collimating lens 63 and the luminous point 62a of incident light, separation between the spectroscope 64 and the collimating lens 63, separation between the collimating lens 63' and the spectroscope 64, and separation between the liquid crystal device 1 and the collimating lens 63' are respectively set to the focal length f of the collimating lenses 63 and 63' on the optical axis.

Next, the operation of the dynamic gain equalizer 60 will be described.

Here, for convenience of explanation, incident light is assumed to be linear polarization polarized in one direction. Incident linear polarization having prescribed direction of polarization transmitted in the optical fiber 61 from the direction of arrow B passes the circulator 65 and exits from the luminous point 62a of PM fiber 62 as linear polarization. Since 4f optical system is formed, the luminous point 62a and the plane of the liquid crystal device 1 is in conjugate relation to each other, so that light spot of the luminous point 62a is formed on the liquid crystal device 1. Since a spectroscope 64 is disposed between the collimating lenses 63 and 63', the plane of the liquid crystal device 1 becomes the Fourier plane, and light from the luminous point 62a passes the collimating lens 63 to become parallel beam, and components of light divided into each wavelength by the spectroscope 64 pass next collimating lens 63' to become band shaped light representing analyzed spectrum of each wavelength on the plane of the liquid crystal device 1.

The liquid crystal device 1 selectively changes the intensity of light resolved into each incident wavelength using individual pixels (not shown) provided in the liquid crystal device 1, and reflects the light at the changed light intensity. Also, a polarizer or a polarization beam splitter is disposed in the front optical path of the liquid crystal device 1, so that the liquid crystal device 1 can manipulate the polarization state of the incident linear polarization to a prescribed value, and thus modulate the intensity of reflected light exiting from the polarizer.

The reflected light reflected from the liquid crystal device 1 follows the optical path leading from the luminous point 62a to the liquid crystal device 1 in reverse order, passing the collimating lens 63', the spectroscope 64, the collimating lens 63, to the luminous point 62a of the PM fiber 62, and to the circulator 65. The reflected light is separated in the circulator 65 to be transmitted through the optical fiber 66 in the direction of the arrow C. When the dynamic gain equalizer 60 is used with the incident polarization in the uncontrolled state, a polarization converter is disposed between the incident light B and the optical fiber 61 in order to convert the non-polarized incident light to linear polarization.

It is possible with the dynamic gain equalizer 60 having the liquid crystal device 1 incorporated therein to selectively control light of specified wavelength to convert the light intensity so as to output light of specified wavelength characteristics or to equalize the wavelength characteristics. Since the liquid crystal device 1 having high durability required for optical communication in an environment of high temperature and high humidity has no mechanical moving part such as MEMS, it can be used as a spatial light modulator having high controllability and reliability. Although the liquid crystal device 1 having seal material 31 is adopted in this dynamic gain equalizer 60, other liquid crystal devices 2-5 as described below can also be adopted.

Another liquid crystal device 2 will be described below.

The liquid crystal device 2 is constructed to have same structure, material and function as the liquid crystal device 1 except in the shape of the gold thick film 35 as the frame shaped structure of the seal material 31 of the first substrate body 10 in the liquid crystal device 1. Therefore, only the construction of the gold thick film 35 will be described below.

Figure 6:
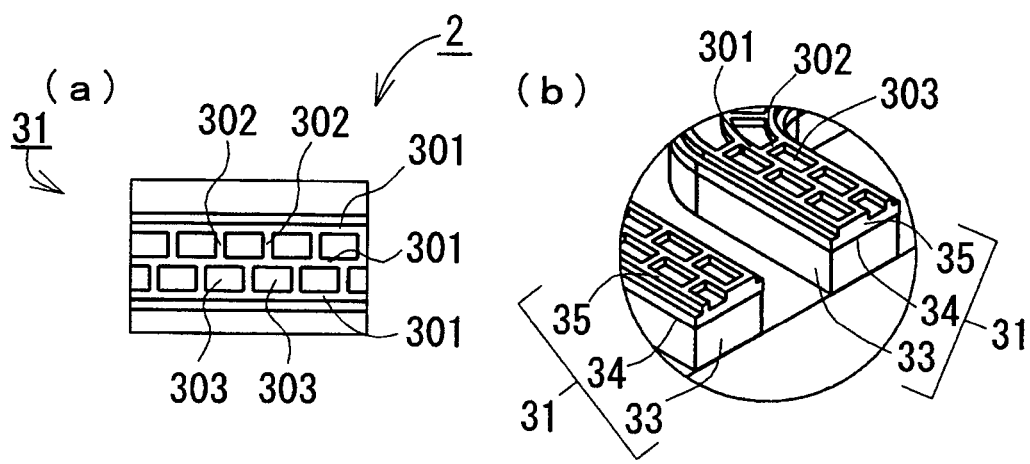
FIG. 6($a$) is a partial enlarged plan view showing the seal material of another liquid crystal device 2.

FIG. 6(a) is a partial enlarged plan view, as in FIG. 4(a), useful for explaining the structure of the gold thick film 35, as seen from the direction of the arrow D (see FIG. 4(c)) relative to the seal material 31. FIG. 6(b) is a partial enlarged perspective view, as in FIG. 4(b), useful for explaining the structure of the gold thick film 35, showing the vicinity of the injection port 38 of the seal material 31. In FIGS. 6(a) and (b), same constituents as in FIGS. 4(a) and (b) are denoted by same reference numerals, and duplicated explanation thereof is omitted.

As shown in FIGS. 6(a) and (b), the seal material formed in width W includes the inorganic spacer material 33 formed of $SiO_2$, Ti film 34, and the gold thick film 35 as a frame shaped structure. The gold thick film 35 of the liquid crystal 2 has a micro-bump structure consisting of three half-etched wall structures in the form of narrow bands each of which extends one complete round on the seal material 31, and a multiplicity of small cells 303 formed by interconnection walls 302 that each interconnects the wall shaped structures 301. By forming a multiplicity of small cells 303 like a hold of a ship, even if there are any defects in the wall shaped structure, any leak of the seal is stopped by some cells so that leak to the outside does not happen. By setting the frame structures 301 and the interconnection walls 302 finely, it is possible to form a shape that can be easily crushed and deformed.

Since the structure constructed in the gold thick film 35 of the liquid crystal device 2 has a multiplicity of small cells 303 that are closely aligned staggeringly in two rows around on the seal material 31, reliability of seal is improved significantly. In order to further improve the reliability of seal, the number of rows of small cells can be increased to three or four. In such case, the width of the walls of the small cells, that is, the wall thickness of the wall shaped structure 301 and the interconnection walls 302 is preferably set narrower.

Still another liquid crystal device 3 will be described below.

The liquid crystal device 3 is constructed to have same structure, material and function as the liquid crystal device 1 except in the shape of the gold thick film 35 as the frame shaped structure of the seal material 31 of the first substrate body 10 in the liquid crystal device 1. Therefore, only the construction of the gold thick film 35 will be described below.

Figure 7:
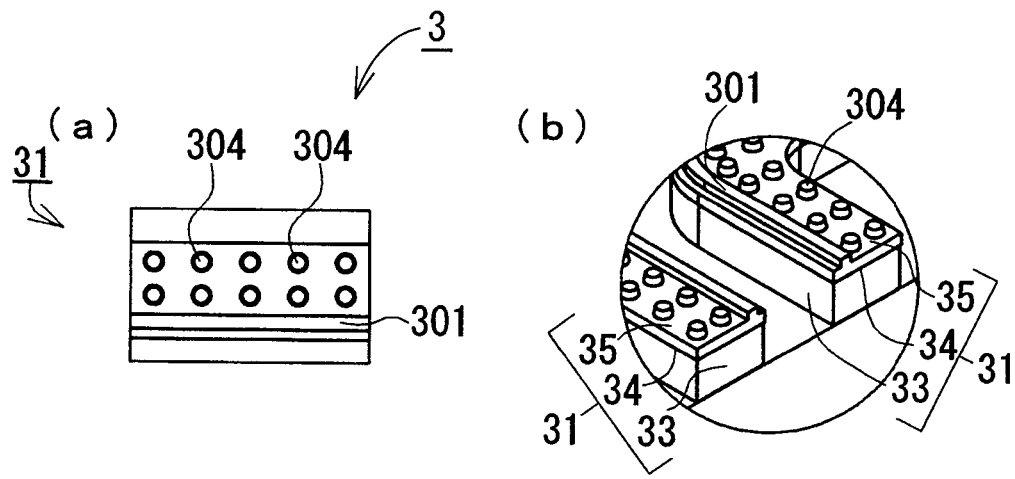
FIG. 7($a$) is a partial enlarged plan view showing the seal material of still another liquid crystal device 3.

FIG. 7(a) is a partial enlarged plan view, as in FIG. 4(a), useful for explaining the structure of the gold thick film 35 on the seal material 31, as seen from the direction of the arrow D (see FIG. 4(c)). FIG. 7(b) is a partial enlarged perspective view, as in FIG. 4(b), useful for explaining the structure of the gold thick film 35, showing the vicinity of the injection port 38 of the seal material 31. In FIGS. 7(a) and (b), same constituents as in FIGS. 4(a) and (b) are denoted by same reference numerals, and duplicated explanation thereof is omitted.

As shown in FIGS. 7(a) and (b), the seal material formed in width W includes the inorganic spacer material 33 formed of $SiO_2$, Ti film 34, and the gold thick film 35 as a frame shaped structure. The gold thick film 35 of the liquid crystal 3 has a micro-bump structure consisting of a wall shaped structure 301 in the form of a narrow band, and pillar shaped structures 304 in the form of a multiplicity of cylindrical protrusions. The wall shaped structure 301 in the form of a narrow band functions mainly as sealing structure, and the multiplicity of pillar shaped structures 304 have main function in joining and adhesion.

By increasing or decreasing the number and diameter of the cylindrical protrusions of the pillar shaped structure 304, it is easy to adjust crushing and deformation of the wall shaped structure 301 and the pillar shaped structure 304 when joined under load, so that it is possible to be securely joined/adhered to the gold film of the second substrate.

Still another liquid crystal device 4 will be described below.

The liquid crystal device 4 is constructed to have same structure, material and function as the liquid crystal device 1 except in the shape of the gold thick film 35 as the frame shaped structure of the seal material 31 of the first substrate body 10 in the liquid crystal device 1. Therefore, only the construction of the gold thick film 35 will be described below.

FIG. 8(a) is a partial enlarged plan view, as in FIG. 4(a), useful for explaining the structure of the gold thick film 35 on the seal material 31, as seen from the direction of the arrow D (see FIG. 4(c)). FIG. 8(b) is a partial enlarged perspective view, as in FIG. 4(b), useful for explaining the structure of the gold thick film 35, showing the vicinity of the injection port 38 of the seal material 31. In FIGS. 8(a) and (b), same constituents as in FIGS. 4(a) and (b) are denoted by same reference numerals, and duplicated explanation thereof is omitted.

Figure 8:
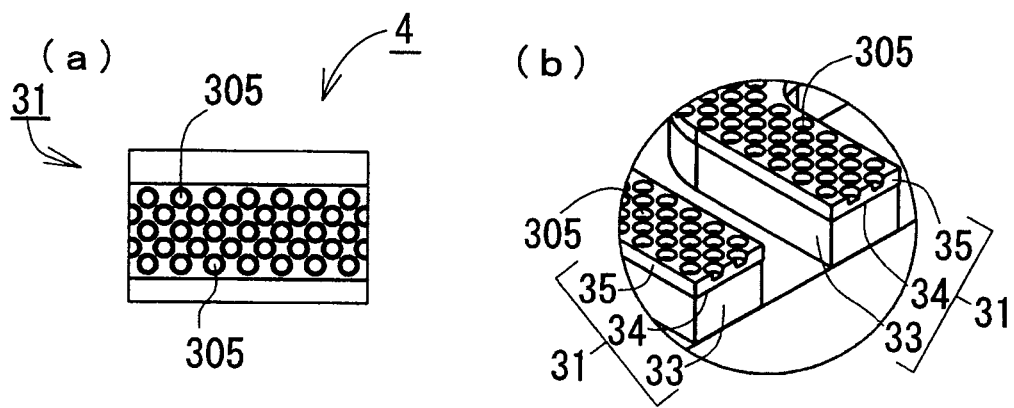
FIG. 8($a$) is a partial enlarged plan view showing the seal material of still another liquid crystal device 4.

As shown in FIGS. 8(a) and (b), the seal material formed in width W includes the inorganic spacer material 33 formed of $SiO_2$, Ti film 34, and the gold thick film 35 as a frame shaped structure. The gold thick film 35 of the liquid crystal 4 has the function of a wall shaped structure. The gold thick film 35 of the liquid crystal device 4 has a multiplicity of dimple shaped recesses, that is, void shaped structures 305 formed over entire width W by half-etching. This is equivalent to the small cells 303 shown in FIG. 6(a) constructed in the form of dimples so as to improve seal performance. Although, in FIG. 8, diameter of all void shaped structures 305 is same, recesses having different diameters may be mixed so as to decrease contact area and improve joining performance.

As has been described above, in the liquid crystal device 1-4, the gold thick film 35 as the frame shaped structure is subjected to half-etching to form various gold structures in order to obtain a gold thick film 35 that can be easily crushed and deformed at the time of joining. Therefore, in the liquid crystal device 1-4, secure seal can be formed when pressurized in joining under atmosphere of normal temperature after the seal material on the first substrate and the seal material on the second substrate are subjected to surface activation treatment.

As has been described above, in the liquid crystal device 1-4, the seal material is formed of inorganic material so that the liquid crystal device can be incorporated in a spatial light modulator that requires high durability in an environment of high temperature and high humidity for optical communication. Thus, since the liquid crystal device 1-4 has the inorganic seal material, the field of application of the liquid crystal device can be expanded significantly.

The method of manufacturing the liquid crystal device 1 will be described below with reference to FIG. 9.

Figure 9:
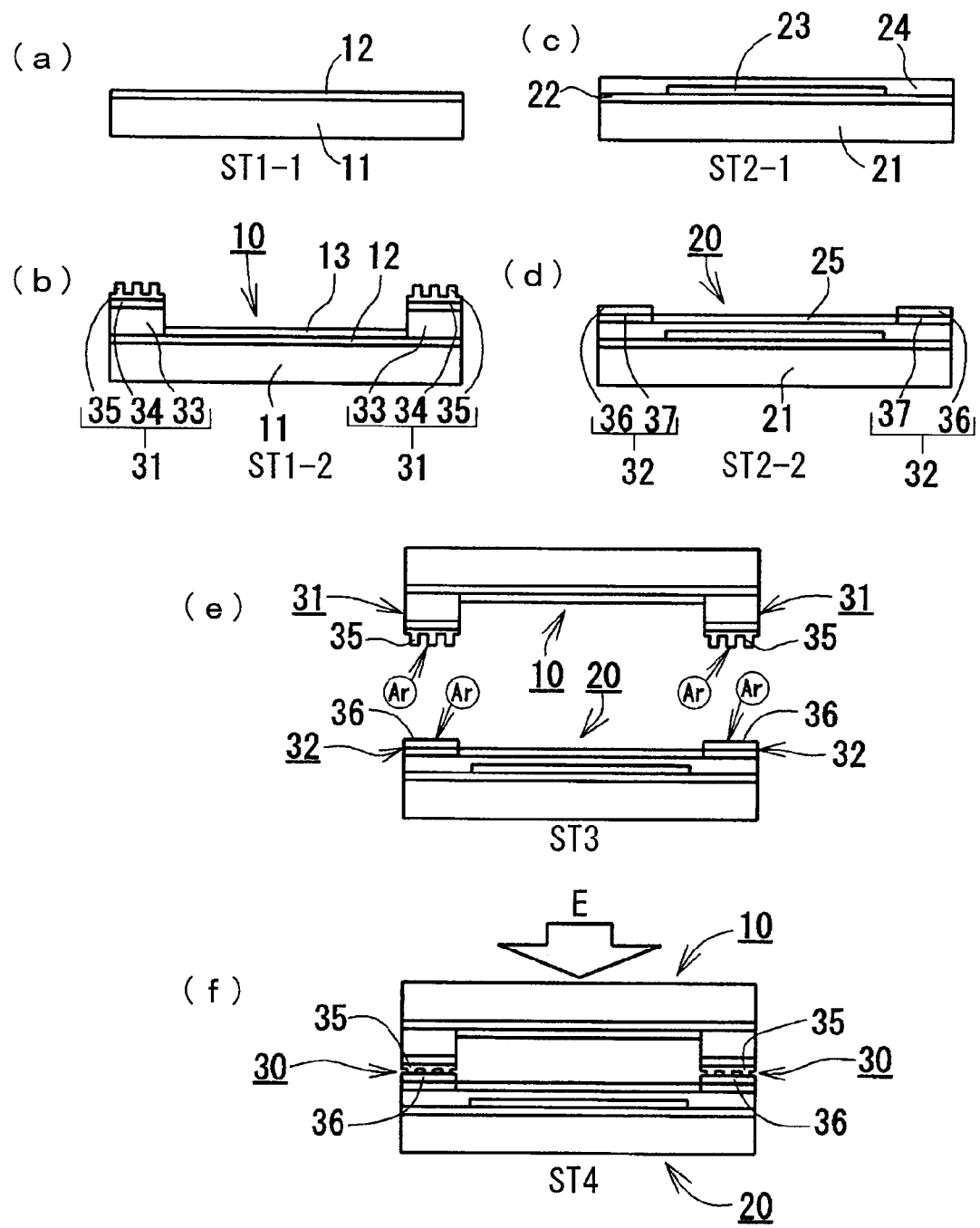
FIGS. 9($a$)~($f$) are views useful for explaining the method of manufacturing the liquid crystal device 1.

FIG. 9 is a process diagram useful for explaining the manufacturing steps of the liquid crystal device 1. Same constituents are denoted by same reference numerals and duplicated explanation thereof will be omitted.

FIG. 9(a) is a view showing the manufacturing step ST1-1.

In the manufacturing step ST1-1, on the glass plate as the first substrate 11 that has been subjected to optical treatment (glass plate having a refractive index matching film and ITO coated thereon and having AR coat on the opposite surface), an opposing electrode 12 consisting of ITO is formed.

FIG. 9(b) is a view showing the manufacturing step ST1-2.

In the manufacturing step ST1-2, the first substrate body 10 having an opposing electrode 12, the first seal material 31 and an alignment film 13 formed on the first substrate 11 is formed. The first seal material 31 includes an inorganic spacer material 33 consisting of $SiO_2$, Ti film 34, and a gold thick film 35 having a wall shaped structure (see FIG. 4) formed thereon in the first seal material forming process (1). The first seal material forming process (1) will be described later.

The manufacturing step shown in FIG. 9 relates to the liquid crystal device 1. In manufacturing the liquid crystal devices 2-4, a metal film 35 having wall shaped structures, pillar shaped structures or void shaped structures formed thereon (see FIG. 6, FIG. 7, and FIG. 8) is formed in the first seal material forming process.

FIG. 9(c) is a view showing the manufacturing step ST2-1.

In the manufacturing step ST2-1, on the second substrate 21 formed of a silicon substrate, a layer formed with CMOS circuit 22, an aluminum electrode forming the pixel electrode 23, and a passivation film 24 for protecting them, are formed.

FIG. 9(d) is a view showing the manufacturing step ST2-2.

In the manufacturing step ST2-2, the second substrate body 20 having CMOS circuit 22, a pixel electrode 23, a passivation film 24, a seal material 32 and an alignment film 25 formed on the second substrate 21 is formed. The second seal material 32 has a Ti film 37 of inorganic spacer material and a gold film formed in the second seal material forming process (1). The second seal material forming process (1) will be described later.

FIG. 9(e) is a view showing the manufacturing step ST3.

The manufacturing step ST3 shows the step of a surface activation treatment. In the step of a surface activation treatment, the first substrate body 10 and the second substrate body 20 are subjected to Argon plasma treatment under vacuum at the level of 6 to 8 Pa, and the gold thick film 35 of the first seal material 31 of the first substrate body 10 and the gold film 36 of the second seal material 32 of the second substrate body 20 are subjected to a surface activation treatment.

FIG. 9(f) is a view showing the manufacturing step ST4.

The manufacturing step ST4 shows a pressurized joining step. In the pressurized joining step, the gold thick film 36 of the first substrate body 10 and the gold film 36 of the second substrate body 20 are aligned and superimposed to each other, and pressurized with a load E in an atmosphere at normal temperature. By crushing and deforming the structures formed in the gold thick film that has been formed by half-etching on the first substrate body 10 (see FIG. 4), it is possible to join and seal the two substrate bodies 10 and 20 by covalent bond of gold atoms. Ti film as the inorganic spacer material supports the gold joint, and plays an important role in enhancing the close adhesion of gold to Si and $SiO_2$.

Next, liquid crystal is injected, and the injection port is sealed. Then, the liquid crystal device base 51 is attached, FPC 52 is attached and wire bonding is done to form the liquid crystal device 1 as shown in FIG. 1.

The surface of the gold thick film 35 of the inorganic first seal material 31 of the first substrate body 10 and the surface of the gold film 36 of the inorganic second seal material 32 of the second substrate body 20 have been activated by Argon plasma treatment, and when superimposed and pressurized to each other, can be integrally stuck to each other to form strong joint by covalent bond of gold atoms. Thus, the liquid crystal device 1 has the construction of inorganic seal material 30 sealed by the seal material of the first and the second substrate bodies, and therefore, has excellent durability in an environment of high temperature and high humidity.

Now, various first seal material forming processes will be described below.

The first seal material forming process (1) described in FIG. 9, will be described below with reference to FIGS. 10-12. In each of the drawings, same constituents are denoted by same reference numerals, and duplicated explanation thereof will be omitted.

FIG. 10(a) is a view showing the manufacturing step ST11-1.

In the manufacturing step ST11-1 (providing ITO substrate), an opposing electrode 12 consisting of ITO is formed on the glass substrate as the first substrate 11.

FIG. 10(b) is a view showing the manufacturing step ST11-2.

Next, in the manufacturing step ST11-2 (coating in the order of TEOS, Ti, gold), $SiO_2$ as the inorganic spacer material 33 for seal material is formed on the opposing electrode 12 of the first substrate 11 by TEOS. Then, Ti film 34 is coated and then gold thick film 35 is coated by vapor deposition. In this manufacturing step as the first spacer forming process, the inorganic spacer material 33 consisting of $SiO_2$ and Ti film 34 for enhancing close adhesion of the gold thick film 35 are coated, and it is possible to determine the thickness of the liquid crystal layer as the thickness of the inorganic spacer material 33, Ti film 34, and the gold thick film 35.

FIG. 10(c) is a view showing the manufacturing step ST11-3.

Next, in the manufacturing step ST11-3 (application of negative resist), in order to form the pattern of the frame shaped seal material by photo lithography, the negative resist 71 is applied to the gold thick film 35.

FIG. 10(d) is a view showing the manufacturing step ST11-4.

Next, in the manufacturing step ST11-4 (UV exposure via the photo resist), the negative resist 71 is subjected to UV irradiation F via a mask in which the pattern shape of the seal material has been formed.

FIG. 10(e) is a view showing the manufacturing step ST11-1.

Next, in the manufacturing step ST11-5 (etching of the negative resist), etching of the negative resist 71 is performed such that the portion exposed and left serves as the mask for forming the seal material in the following manufacturing steps.

FIG. 11(a) is a view showing the manufacturing step ST11-6.

Next, in the manufacturing step ST11-6 (etching of gold, Ti), in order to form the seal material, the portion of Ti film 34, the gold thick film 35 not masked by the negative resist 71 is removed by etching or the like.

FIG. 11(b) is a view showing the manufacturing step ST11-7.

Next, in the manufacturing step ST11-7 (TEOS etching), in order to form the inorganic spacer material 33 of the seal material, $SiO_2$ in the unmasked portion of the negative resist 71 is removed by reactive ion etching (hereinafter referred to as RIE).

FIG. 11(c) is a view showing the manufacturing step ST11-8.

Next, in the manufacturing step ST11-8 (coating of alignment film), $SiO_2$ which is to become the alignment film 13 is formed by oblique deposition.

FIG. 11(d) is a view showing the manufacturing step ST11-9.

Next, in the manufacturing step ST11-9 (negative resist removal), the negative resist 71 for forming the seal material is removed, and at the same time, $SiO_2$ on the alignment film 13 deposited on the negative resist is removed by lift-off.

FIG. 11(e) is a view showing the manufacturing step ST11-10.

Next, in the manufacturing step ST11-10 (application of negative resist), the negative resist 72 for forming structures on the gold thick film 35 is applied. The manufacturing steps ST11-10~ST11-14 are micro-bump structure forming steps in which the gold thick film is subjected to half-etching in order to form wall shaped structures, pillar shaped structures or void shaped structures on the surface of the gold thick film.

FIG. 12(a) is a view showing the manufacturing step ST11-11.

Next, in the manufacturing step ST11-11 (UV exposure via photo mask), UV exposure F is performed via the mask 82 in order to form structures of the gold thick film.

FIG. 12(b) is a view showing the manufacturing step ST11-12.

Next, in the manufacturing step ST11-12 (etching of negative resist), in order to form the portion that is to become the structures of the gold thick film 35, etching of the negative resist 72 is performed to form the mask leaving the exposed portion.

FIG. 12(c) is a view showing the manufacturing step ST11-13.

Next, in the manufacturing step ST11-13 (ion milling), ion milling is performed to half-etch the masked gold thick film 35 so as to form wall shaped structures, void shaped structures or pillar shaped structures in the gold thick film 35.

FIG. 12(d) is a view showing the manufacturing step ST11-14.

Next, in the manufacturing step ST11-14 (removal of negative resist), the negative resist 72 is removed, and then $O_2$ plasma ashing is performed to remove the residual resist on the alignment film 13. The first seal material 31 (inorganic spacer material 33, Ti film 34 and gold thick film 35) is formed on the first substrate 11, and the first substrate body 10 is formed.

As has been described above, in the first seal material forming process (1), known photolithography technology is used to form an inorganic shield material on the glass substrate and structures on the gold thick film, and thus form the first seal material 31 on the first substrate body 10.

Another first seal material forming process (2) will be described below.

Another first seal material forming process (2) is the step different from the first seal material forming process (1). In another first seal material forming process (2), the gold thick film is used as a shield to etch the alignment film consisting of $SiO_2$, so that the substrate having resist thereon is kept outside of the alignment film deposition apparatus, and the apparatus is not contaminated in the manufacturing step.

Figure 13:
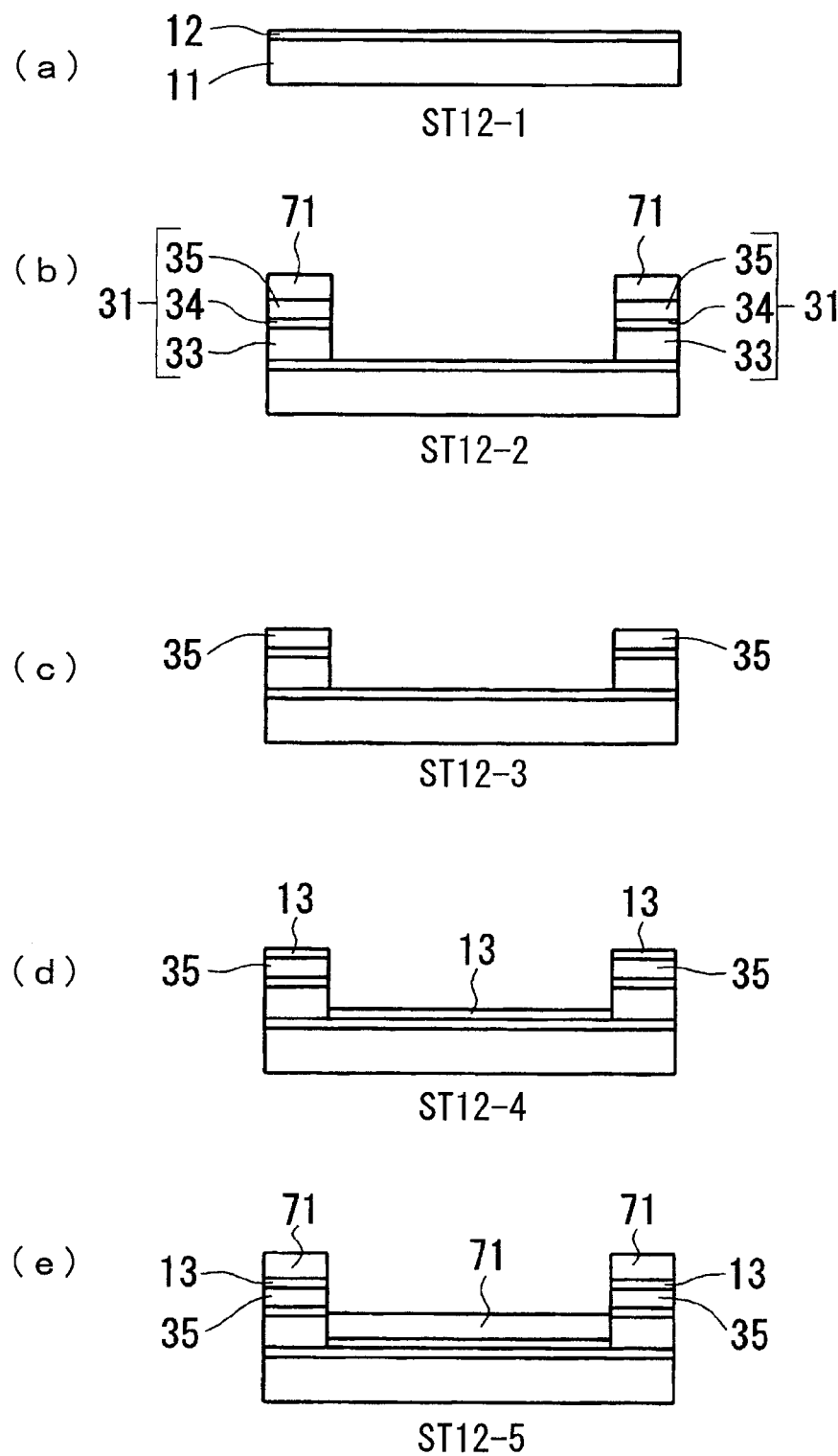
FIGS. 13($a$)~($e$) are process drawings (1) useful for explaining another first seal material forming process (2)
Figure 14:
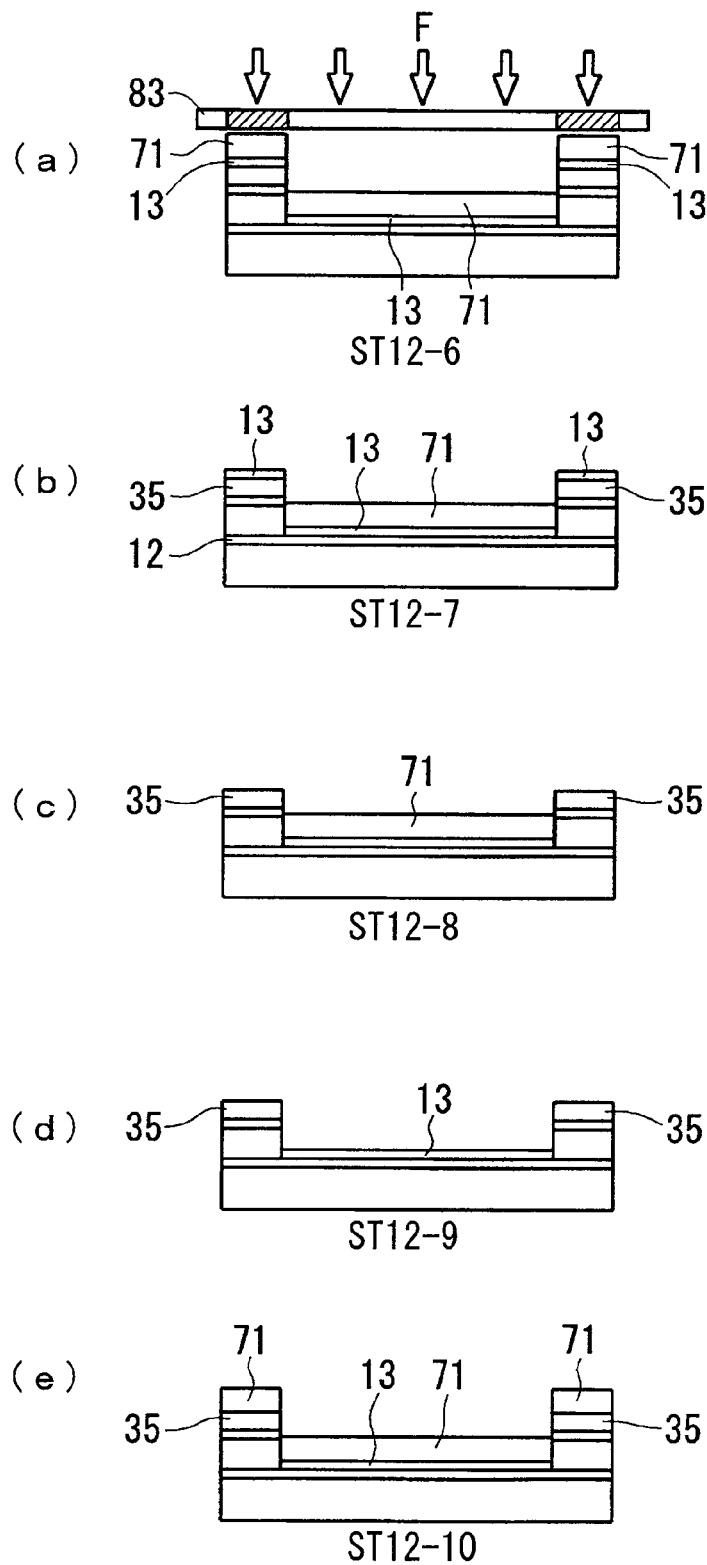
FIGS. 14($a$)~($e$) are process drawings (2) useful for explaining another first seal material forming process (2)

FIG. 13 and FIG. 14 are process drawings useful for explaining another first seal material forming process (2). In each of the drawings, same constituents are denoted by same reference numerals, and duplicated explanation thereof will be omitted. Another first seal material forming process (2) can be adopted, in place of the first seal material forming process (1), in the manufacturing step of the liquid crystal device 1 as shown in FIG. 9.

Since manufacturing steps ST12-1 and ST12-2 in another first seal material forming process (2) are common to the manufacturing steps ST11-1-ST11-7 in the first seal material forming process (1), explanation thereof will be omitted. Also, the micro-bump structure forming step ST 12-10 and subsequent steps in another first seal material forming process (2) are common to the manufacturing steps ST11-10-ST11-14 in the first seal material forming process (1), explanation thereof will be omitted.

FIG. 13(a) is a view showing the manufacturing step ST12-1.

In the manufacturing step ST12-1 (providing ITO substrate), as in the previous exemplary embodiment, an opposing electrode 12 consisting of ITO is formed on the glass substrate as the first substrate 11.

FIG. 13(b) is a view showing the manufacturing step ST12-2.

Next, in the manufacturing step ST12-2 (TEOS etching), in order to form the first seal material 31, $SiO_2$ of the inorganic spacer material 33 is removed by RIE. As has been described above, the first seal material 31 is formed from inorganic spacer material 33, Ti film 34, and the gold thick film 35.

FIG. 13(c) is a view showing the manufacturing step ST12-3.

The manufacturing step ST12-3 (removal of negative resist) is a manufacturing step of coating an alignment film. In the manufacturing step of coating an alignment film, in order to coat an alignment film on a substrate having no negative resist adhered thereto, the negative resist 71 is removed (see ST12-2).

FIG. 13(d) is a view showing the manufacturing step ST12-4.

Next, in the manufacturing step ST12-4 (coating of alignment film), an alignment film 13 consisting of $SiO_2$ is coated to the entire surface by oblique deposition with an alignment film deposition apparatus.

FIG. 13(e) is a view showing the manufacturing step ST12-5.

Next, in the manufacturing step ST12-5 (application of negative resist), as a manufacturing step for removing the alignment film on the gold thick film 35, negative resist 71 is first applied to the alignment film 13.

FIG. 14(*a*) is a view showing the manufacturing step ST12-6.

Next, in the manufacturing step ST12-6 (UV exposure via photo mask), in order to prepare for removal of alignment film 13 formed on the seal material, UV exposure is performed to the negative resist 71 via the photo mask 83.

FIG. 14(*b*) is a view showing the manufacturing step ST12-7.

Next, in the manufacturing step ST12-7 (etching of negative resist), the negative resist 71 on the seal material is selectively removed so as to leave the negative resist masking the alignment film 13 on the opposing electrode 12 and to expose the alignment film 13 on the gold thick film 35.

FIG. 14(*c*) is a view showing the manufacturing step ST12-8.

Next, in the manufacturing step ST12-8 ($SiO_2$ etching), the alignment film 13 consisting of $SiO_2$ formed on the gold thick film 35 is removed by RIE with the gold thick film 35 as a shield.

FIG. 14(*d*) is a view showing the manufacturing step ST12-9.

Next, in the manufacturing step ST12-9 (removal of negative resist), the negative resist 71 on the alignment film 13 is removed.

FIG. 14(*e*) is a view showing the manufacturing step ST12-10.

Next, in the manufacturing step ST12-10 (application of negative resist) as the manufacturing step for forming structures in the gold thick film 35, negative resist 71 is applied onto the gold thick film 35 and the alignment film 13.

The manufacturing steps for forming structures in the gold thick film in ST12-10 and subsequent steps are steps for forming micro-bump structures, and are common to the manufacturing step ST11-10~manufacturing step ST11-14, and explanation thereof will be omitted.

As has been described above, in accordance with another first seal material forming process, since the manufacturing step of obliquely depositing an alignment film to a substrate having no negative resist attached thereto is included, it is possible to form the first substrate body 10 using the manufacturing step that does not contaminate the alignment film deposition apparatus.

Still another first seal material forming process (3) will be described below.

Figure 10:
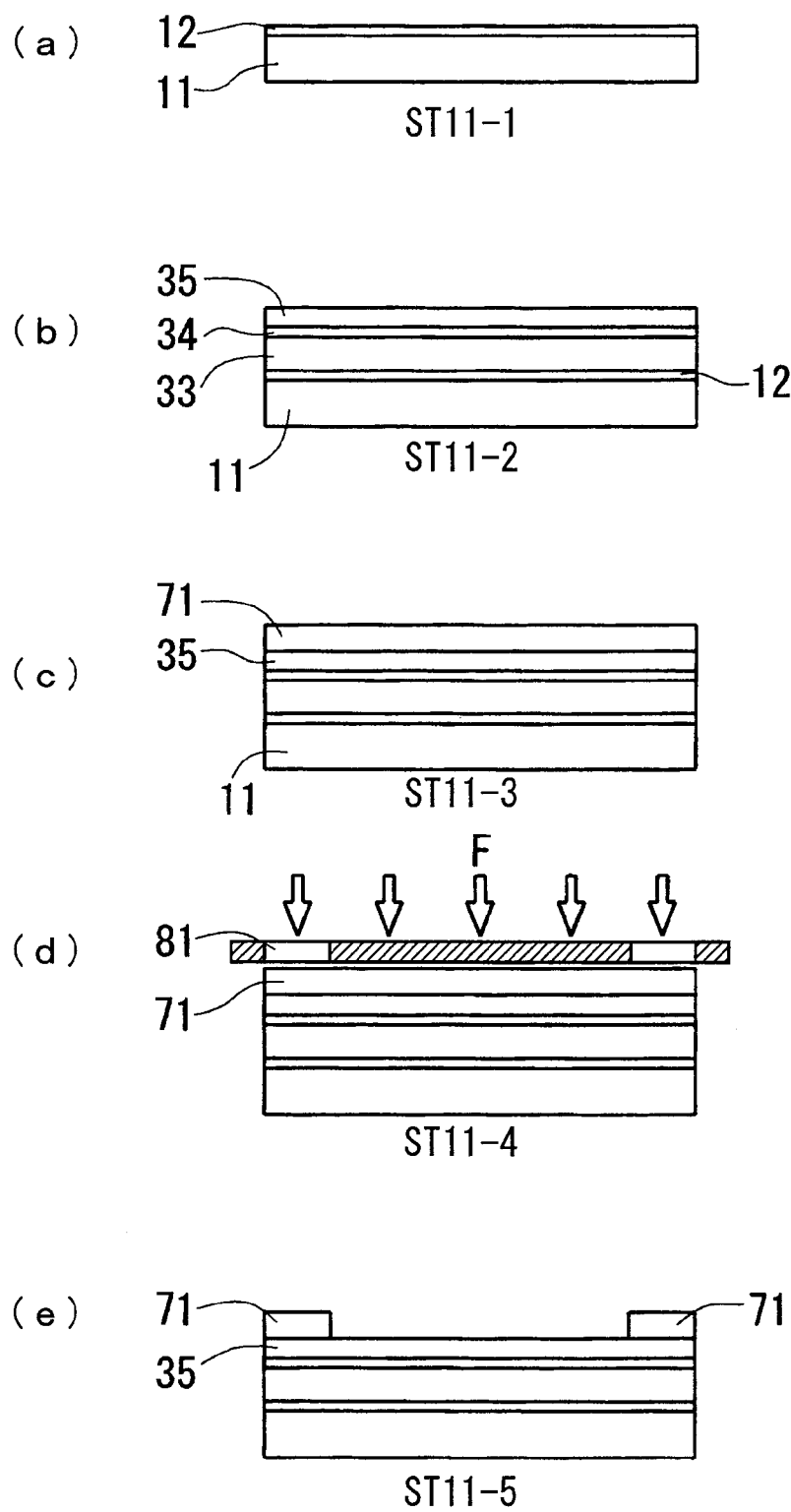
FIGS. 10($a$)~($e$) are process drawings (1) useful for explaining the first seal material forming process (1)
Figure 11:
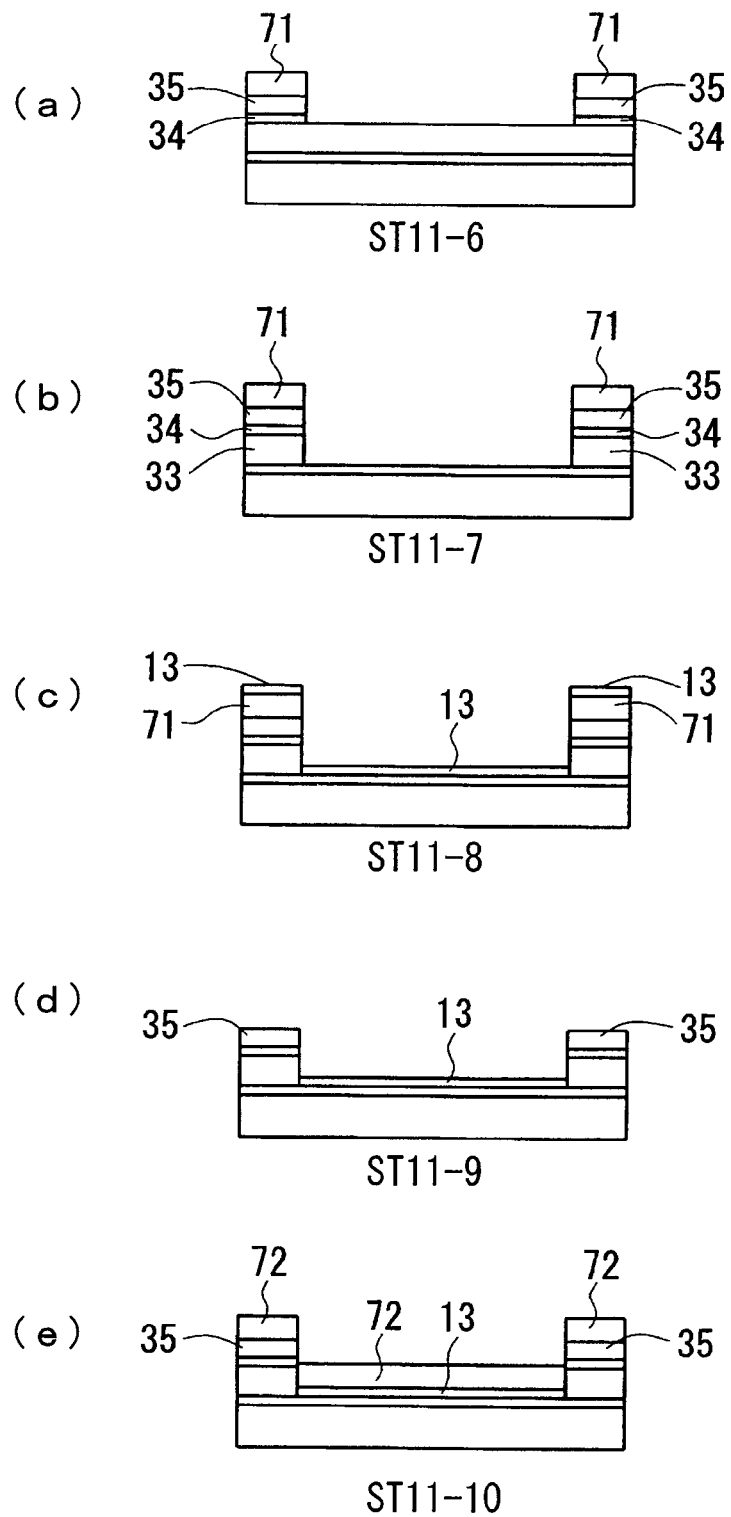
FIGS. 11($a$)~($e$) are process drawings (2) useful for explaining the first seal material forming process (1)
Figure 12:
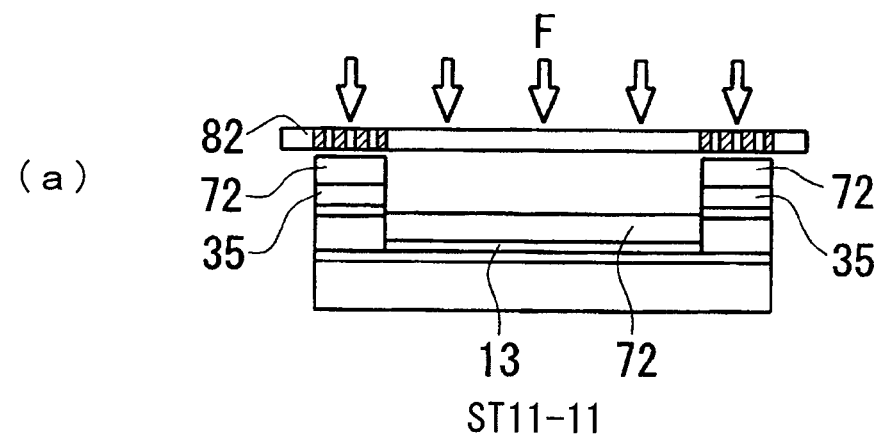
FIGS. 12($a$)~($d$) are process drawings (3) useful for explaining the first seal material forming process (1)
Figure 12:
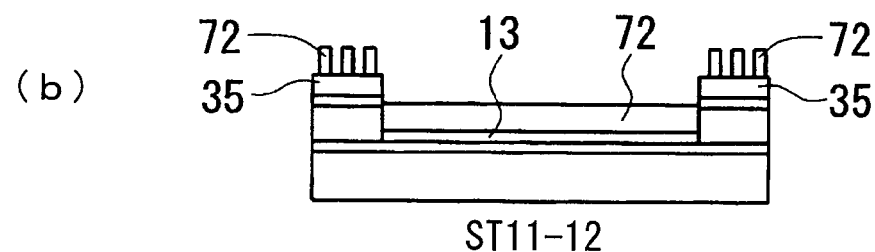
Figure 12:
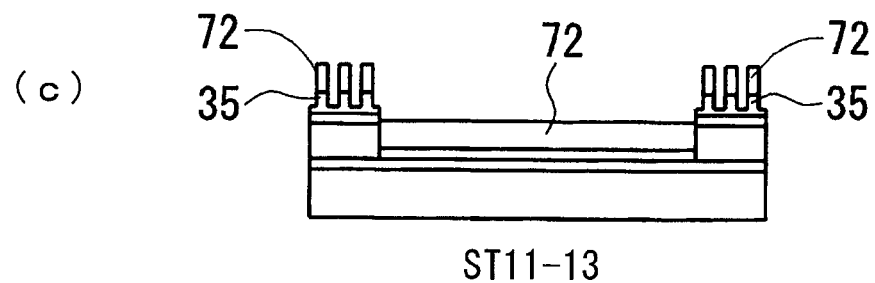
Figure 12:
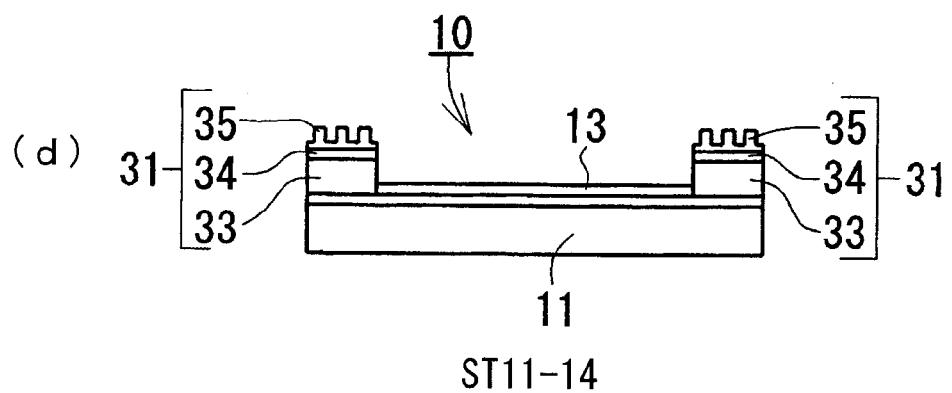

Still another first seal material forming process (3) is a step different from the first seal material forming process (1) as shown in FIGS. 10-12. In the still another first seal material forming process (3), the negative resist is not used as a shield, but the gold thick film is used as a shield to form the inorganic space material 33.

Figure 15:
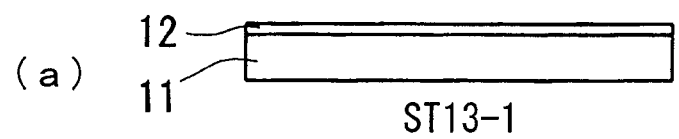
FIGS. 15($a$)~($e$) are process drawings (1) useful for explaining still another first seal material forming process (3)
Figure 15:
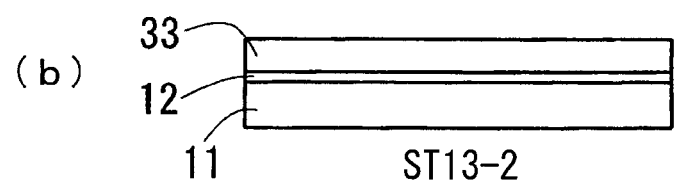
Figure 15:
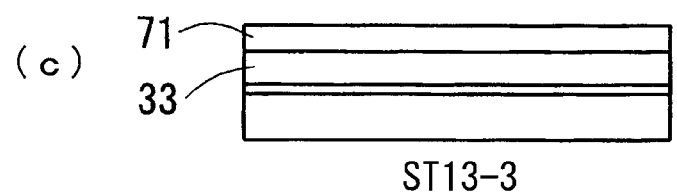
Figure 15:
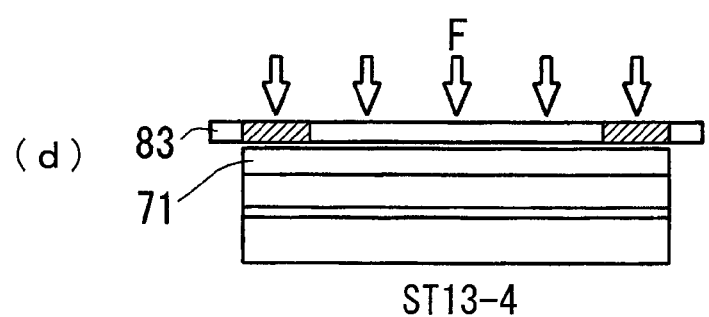
Figure 15:
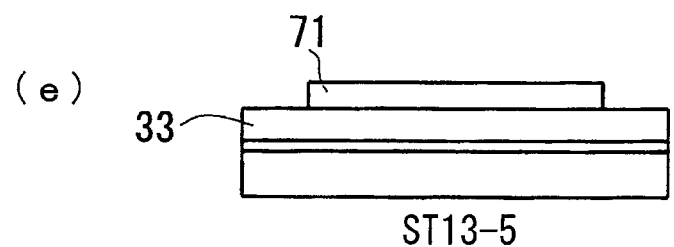
Figure 16:
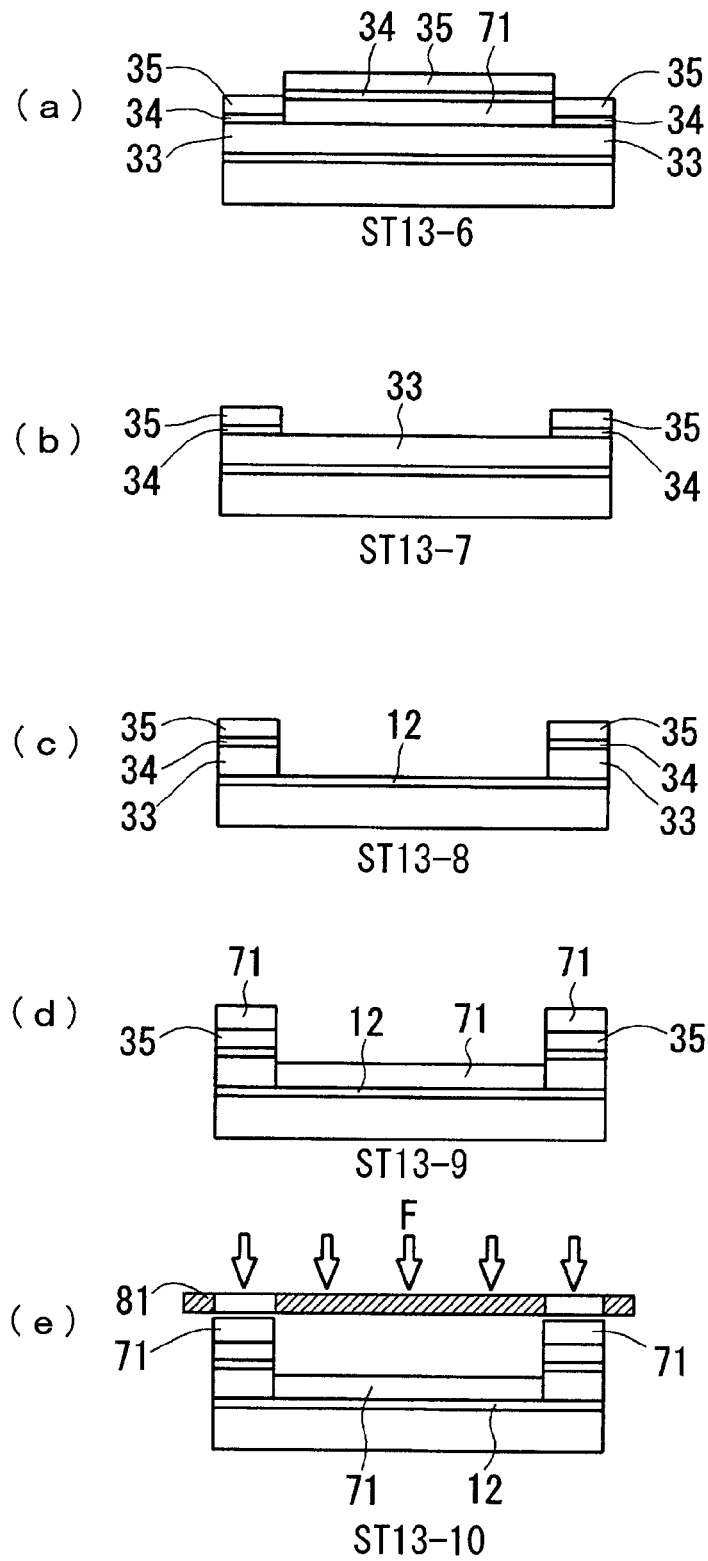
FIGS. 16($a$)~($e$) are process drawings (2) useful for explaining still another first seal material forming process (3)
Figure 17:
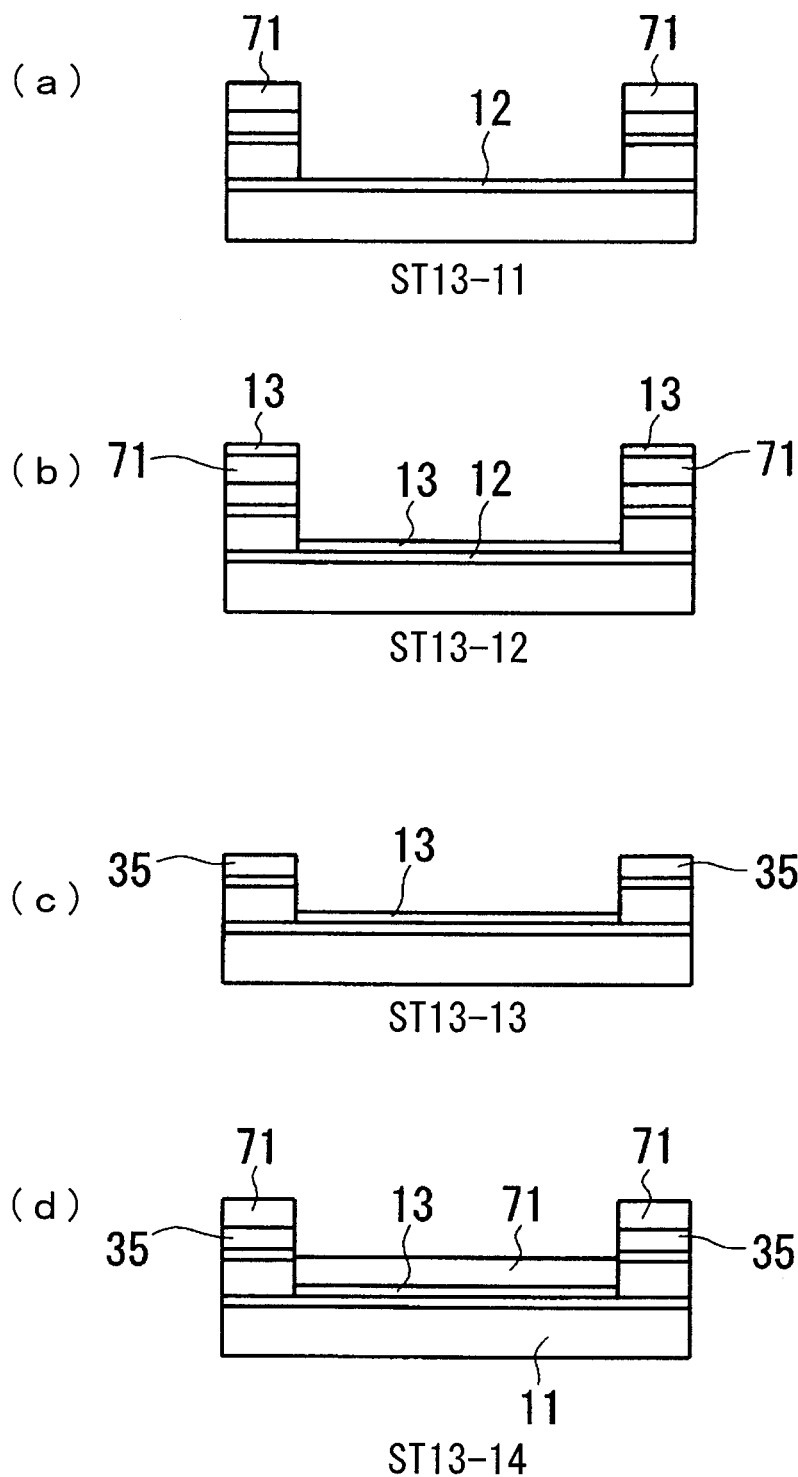
FIGS. 17($a$)~($d$) are process drawings (3) useful for explaining still another first seal material forming process (3)

FIGS. 15-17 are process drawings useful for explaining the still another first seal material forming process (3). In each of the drawings, same constituents are denoted by same reference numerals, and duplicated explanation thereof will be omitted. The still another first seal material forming process (3) can be adopted, in place of the first seal material forming process (1), in the manufacture of the liquid crystal device 1.

The manufacturing step ST13-14 and subsequent steps in the still another first seal material forming process (3) are for forming micro-bump structures, and are common to the manufacturing steps ST11-10-ST11-14, and therefore, explanation thereof will be omitted.

FIG. 15(*a*) is a view showing the manufacturing step ST13-1.

In the manufacturing step ST13-1 (providing ITO substrate), as in the previous exemplary embodiment, an opposing electrode 12 consisting of ITO is formed on the glass substrate as the first substrate 11.

FIG. 15(*b*) is a view showing the manufacturing step ST13-2.

Next, in the manufacturing step ST13-2 (TEOS coating), $SiO_2$ that is to become the inorganic spacer material 33 is formed by TEOS on the opposing electrode 12 of the first substrate 11.

FIG. 15(*c*) is a view showing the manufacturing step ST13-3.

Next, in the manufacturing step ST13-3 (application of negative resist), in order to form the pattern of the frame shaped seal region by photolithography, negative resist 71 is applied onto the inorganic spacer material.

FIG. 15(*d*) is a view showing the manufacturing step ST13-4.

Next, in the manufacturing step ST13-4 (UV exposure via photo mask), UV irradiation F is performed to the negative resist 71 via the mask 83 having the pattern shape of the seal region formed therein.

FIG. 15(*e*) is a view showing the manufacturing step ST13-5.

Next, in the manufacturing step ST13-5 (etching of negative resist), the negative resist 71 is etched such that the portion not exposed is removed to become the seal region.

FIG. 16(*a*) is a view showing the manufacturing step ST13-6.

Next, in the manufacturing step ST13-6 (coating of gold, Ti), in order to form the seal material, Ti film 34, and gold thick film 35 are coated on the inorganic spacer material 33 and the negative resist 71. In this manufacturing step as the first spacer forming step, Ti film 34 is coated to increase the close adhesion of the gold thick film 35 to the inorganic spacer material 33 consisting of $SiO_2$, and at the same time, thickness of the liquid crystal layer can be determined by thickness of the inorganic spacer material 33, Ti film 34, and the gold thick film 35.

FIG. 16(*b*) is a view showing the manufacturing step ST13-7.

Next, in the manufacturing step ST13-7 (lift-off), the negative resist 71 on the inorganic spacer material 33 is removed. Therefore, the gold and Ti film having been formed on the negative resist 71 is also removed.

FIG. 16(*c*) is a view showing the manufacturing step ST13-8.

Next, in the manufacturing step ST13-8 (etching of the inorganic spacer material 33 with the gold film as a protecting film), the inorganic spacer material 33 is removed by RIE with the gold thick film 35 as a mask.

FIG. 16(*d*) is a view showing the manufacturing step ST13-9.

Next, in the manufacturing step ST13-9 (application of negative resist), the negative resist 71 is applied onto the transparent electrode 12 and the gold thick film 35.

FIG. 16(*e*) is a view showing the manufacturing step ST13-10.

Next, in the manufacturing step ST13-10 (UV exposure via photo mask), as a procedure for coating alignment film, UV exposure F is performed via the mask 81 in order to remove the negative resist on the transparent electrode 12.

FIG. 17(*a*) is a view showing the manufacturing step ST13-11.

Then, as shown in FIG. 17, in the manufacturing step ST13-11 (etching of negative resist), the negative resist 71 on the transparent electrode 12 is removed by etching.

FIG. 17(b) is a view showing the manufacturing step ST13-12.

Next, in the manufacturing step ST13-12 (coating of alignment film), an alignment film 13 consisting of $SiO_2$ is coated on the transparent electrode 12 and the negative resist 71 by oblique deposition.

FIG. 17(c) is a view showing the manufacturing step ST13-13.

Next, in the manufacturing step ST13-13 (lift-off), the negative resist 71 formed on the gold thick film 35 is removed. Therefore, the alignment film 13 formed on the negative resist 71 is also removed, and the gold thick film becomes top surface.

FIG. 17(d) is a view showing the manufacturing step ST13-14.

Next, in the manufacturing step ST13-14 (application of negative resist) as manufacturing step fro forming structures in the gold thick film 35, negative resist 71 is applied onto the gold thick film 35 and the alignment film 13.

The manufacturing step ST13-14 and subsequent manufacturing steps are steps for forming micro-bump structures, and are common to the manufacturing steps ST11-10~ST11-14 shown in FIGS. 11 and 12, and therefore, explanation thereof will be omitted.

As has been described above, in accordance with the still another first seal material forming process, etching of Ti film 34 and the gold thick film 35 included in the first seal material forming process becomes unnecessary, so that damage to the substrate due to etching can be reduced.

Still another first seal material forming process (4) will be described below.

Still another first seal material forming process (4) is a step different from the first seal material forming process (1) shown in FIGS. 10-12. In the still another first seal material forming process (4), the alignment film consisting of $SiO_2$ is etched with the gold thick film as a shield, so that the substrate having resist thereon is kept outside of the alignment film deposition apparatus.

Figure 18:
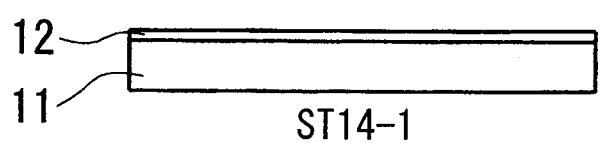
FIGS. 18($a$)~($c$) are process drawings useful for explaining still another first seal material forming process (4)
Figure 18:
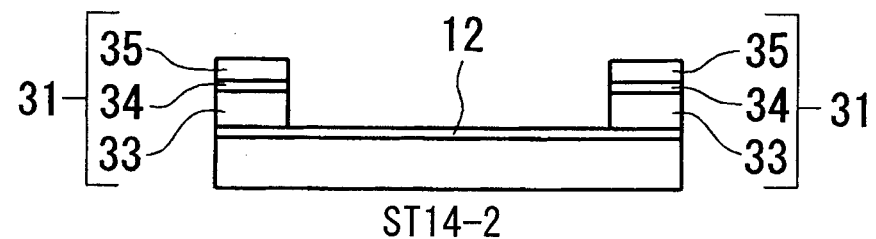
Figure 18:
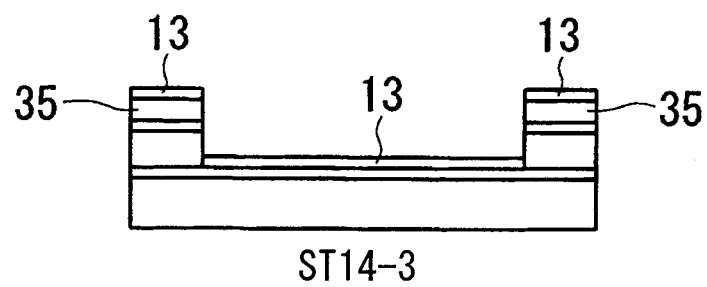

FIG. 18 is a process drawing useful for explaining the still another first seal material forming process (4). In each of the drawings, same constituents are denoted by same reference numerals, and duplicated explanation thereof will be omitted. The still another first seal material forming process (4) shown in FIG. 18 may be adopted in the manufacturing step of liquid crystal device 1 in place of the first seal material forming process (1) shown in FIG. 9.

The manufacturing steps ST 14-1 and ST14-2 in the still another first seal material forming process (4) are common to the manufacturing steps ST 13-1-ST13-8 in the still another first seal material forming process (3), and therefore, explanation thereof is omitted. The manufacturing step ST 14-3 and subsequent steps for forming micro-bump structures in the still another first seal material forming process (4) are common to the manufacturing step ST 12-4 and subsequent step included in another first seal material forming process (2) shown in FIGS. 13 and 14, and therefore, explanation thereof is omitted.

FIG. 18(a) is a view showing the manufacturing step ST14-1.

In the manufacturing step ST14-1 (providing ITO substrate), as in previous exemplary, an opposing electrode 12 consisting of a transparent electrode (hereinafter referred to as ITO) is formed on the glass substrate as the first substrate 11.

FIG. 18(b) is a view showing the manufacturing step ST14-2.

Next, in the manufacturing step ST14-2 (etching of the inorganic spacer material 33 with the gold as protecting film) as in the manufacturing step ST13-8 shown in FIG. 16, the inorganic spacer material 33 consisting of $SiO_2$ is removed by RIE with the gold thick film 35 as a mask and ITO (transparent electrode 12) as etch-stopper. Thus, the first seal material 31 is formed from the inorganic spacer material 33, Ti film 34, and the gold thick film 35.

FIG. 18(c) is a view showing the manufacturing step ST14-3.

Next, in the manufacturing step ST14-3 (coating of alignment film), an alignment film 13 consisting of $SiO_2$ is coated by oblique deposition using an alignment film deposition apparatus on the substrate having the negative resist removed. This manufacturing step is identical to the manufacturing step ST12-4 shown in FIG. 13. In subsequent manufacturing steps after ST14-3, the first substrate body 10 is formed in identical manufacturing steps to the manufacturing step ST12-4 and subsequent manufacturing steps.

As has been described, in accordance with the still another first seal material forming process (4), since the substrate having the negative resist is not loaded into the alignment film deposition apparatus, the first substrate body 10 can be formed in the manufacturing steps that do not contaminate the alignment film deposition apparatus.

Still another first seal forming process (5) will be described below.

Still another first seal forming process (5) is a process different from the first seal forming process (1) shown in FIGS. 10~12. In the still another first seal forming process (5), the portion where the liquid crystal layer is formed is formed later (the portion that is to become seal material is formed first).

Figure 19:
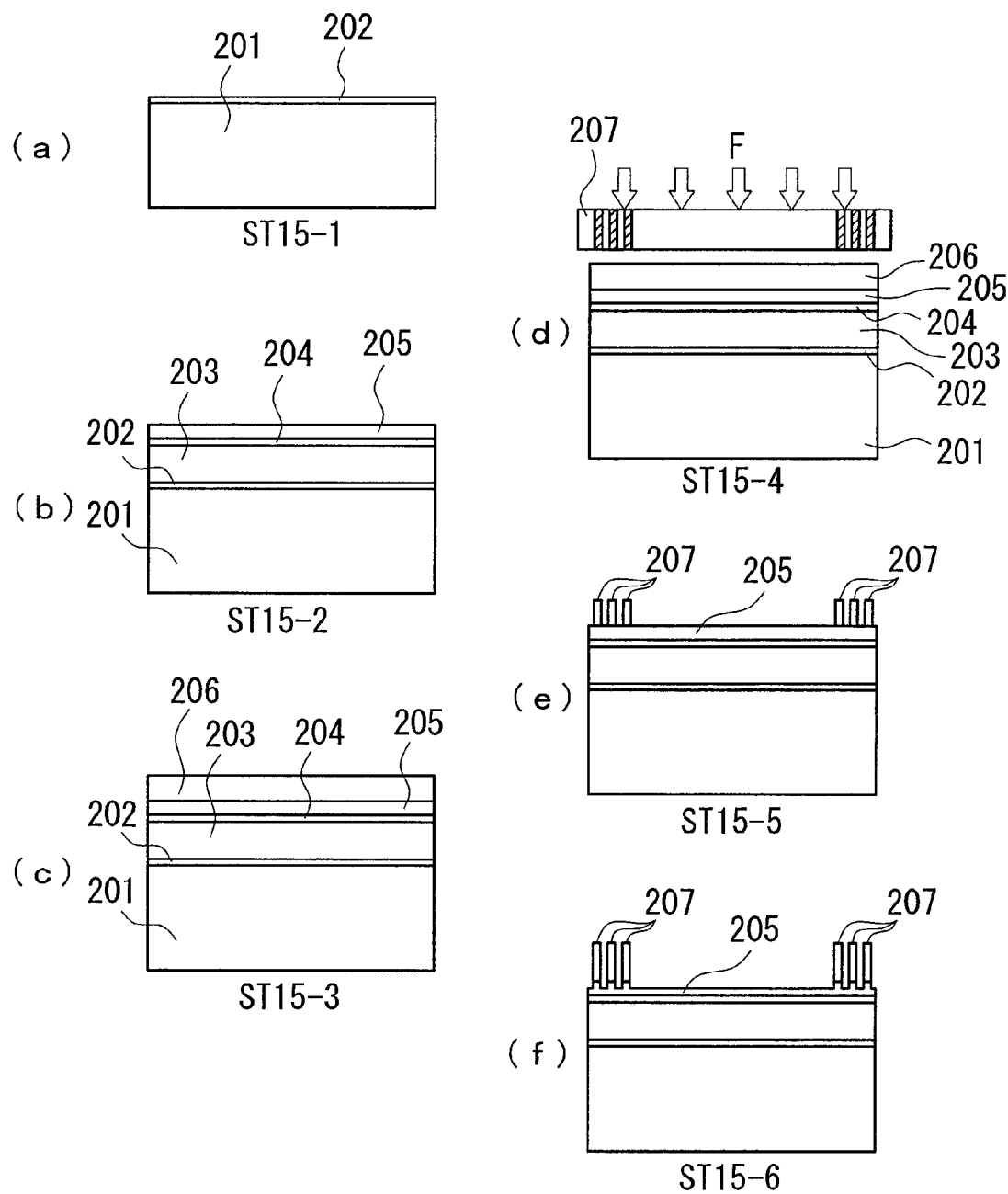
FIGS. 19($a$)~($f$) are process drawings (1) useful for explaining still another first seal material forming process (5)
Figure 20:
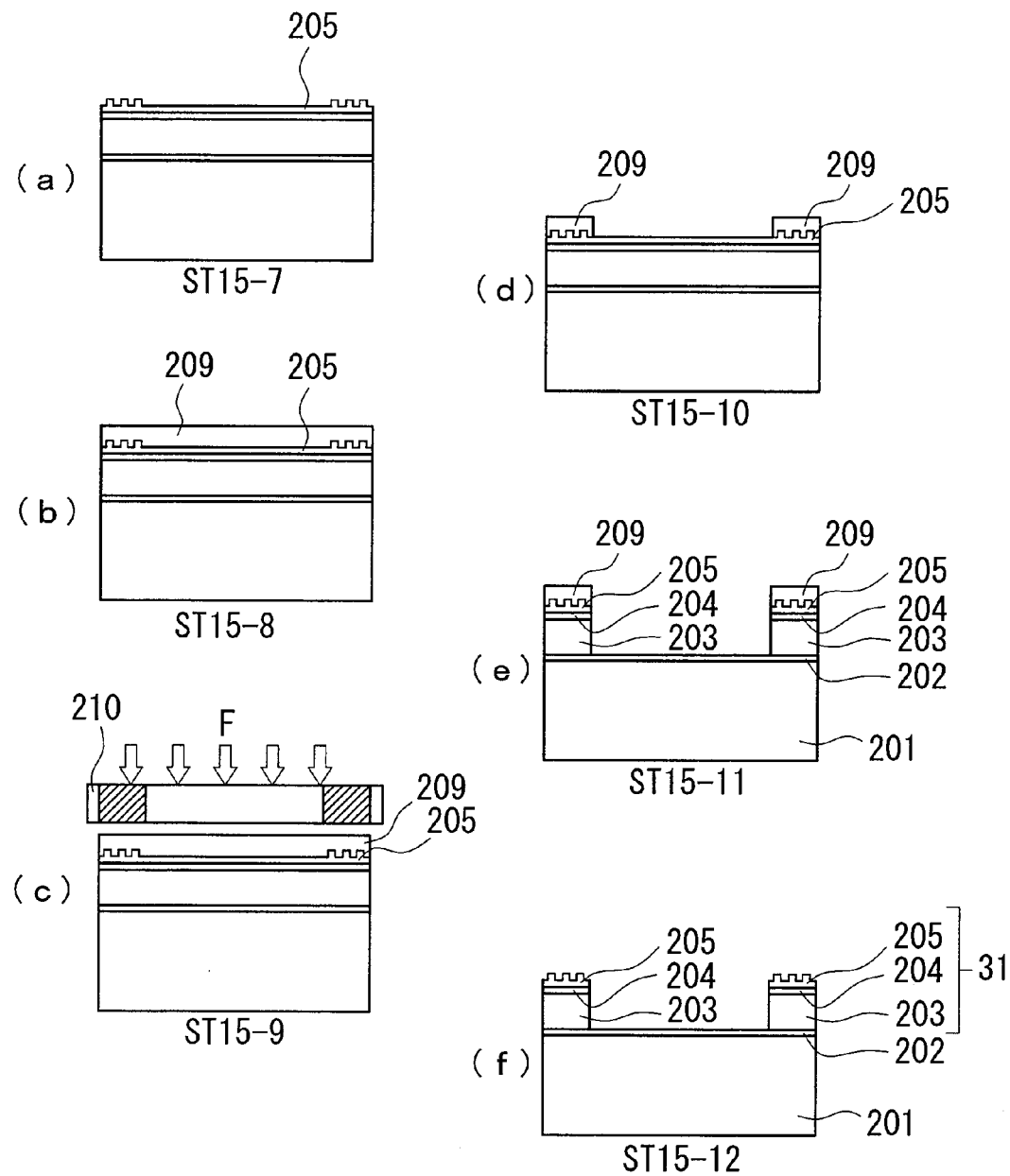
FIGS. 20($a$)~($f$) are process drawings (2) useful for explaining still another first seal material forming process (5)
Figure 21:
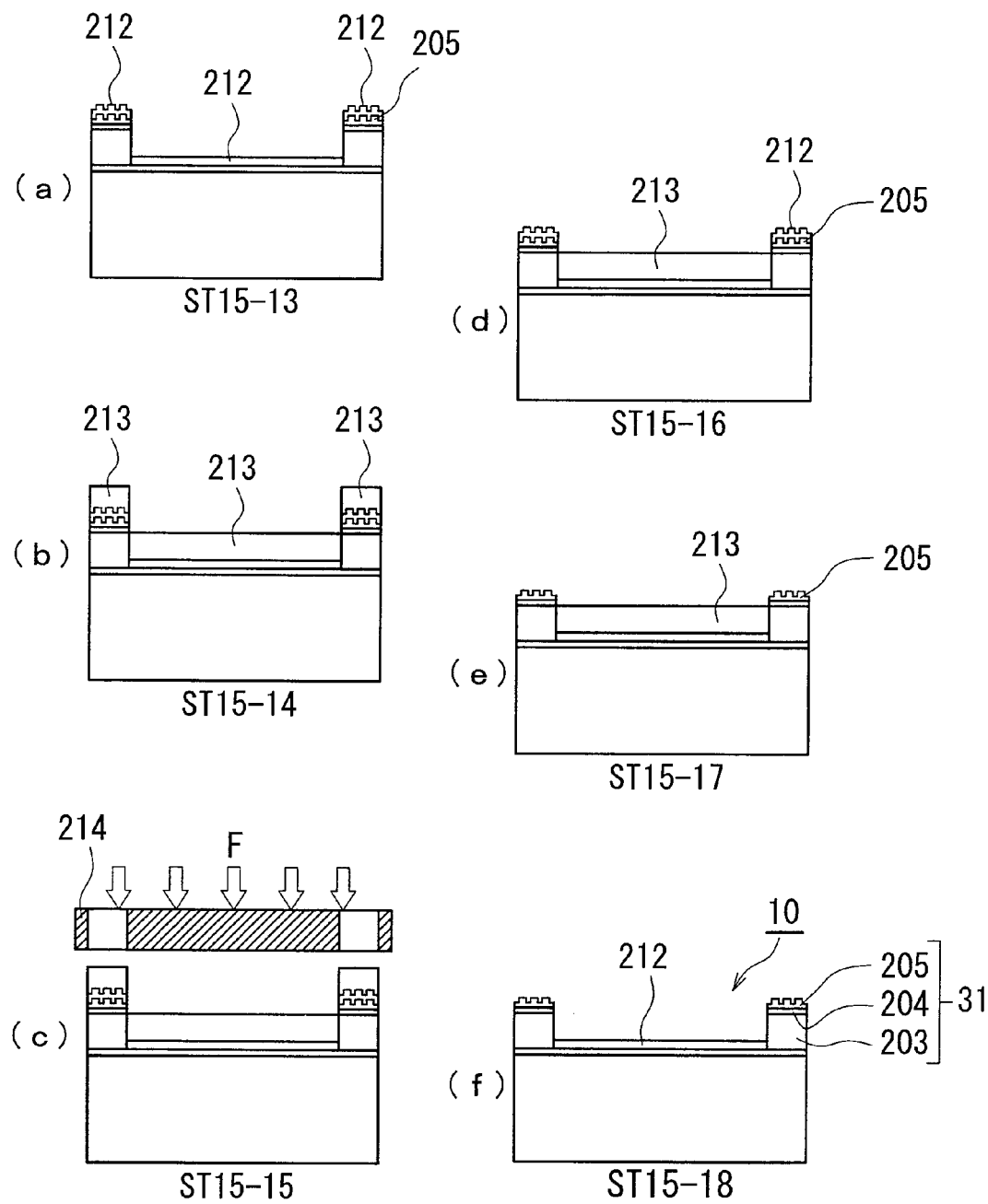
FIGS. 21($a$)~($f$) are process drawings (3) useful for explaining still another first seal material forming process (5)

FIGS. 19-21 are process drawings useful for explaining still another first seal forming process (5). In each of the drawings, same constituents are denoted by same reference numerals and duplicated explanation thereof is omitted. The still another first seal forming process (5) may be adopted in the manufacturing process of liquid crystal device 1 in place of the first seal forming process (1) shown in FIG. 9.

FIG. 19(a) is a view showing the manufacturing step ST15-1.

In the manufacturing step ST15-1 (providing ITO substrate), an opposing electrode 202 consisting of ITO is formed on the glass substrate as the first substrate 201.

FIG. 19(b) is a view showing the manufacturing step ST15-2.

Next, in the manufacturing step ST15-2 (TEOS, coating of Ti, gold in this order), $SiO_2$ as inorganic spacer material 203 that is to become seal material is formed on the opposing electrode 202 of the first substrate 201. Thereafter, Ti film 204, and the gold thick film 205 are coated by vapor deposition. This manufacturing step makes it possible to coat, as the first spacer forming step, Ti film 204 for increasing close adhesion of the inorganic spacer material 203 consisting of $SiO_2$ and the gold thick film 205, and at the same time, to determine the thickness of the liquid crystal layer by the thickness of the Ti film 204 and the gold thick film 205.

FIG. 19(c) is a view showing the manufacturing step ST15-3.

Next, in the manufacturing step ST15-3 (application of photo resist), in order to form wall shaped structures (pillar shaped structures or void structures in the case of liquid crystal device 3 or 4) by photolithography, positive resist 206 is applied to the gold thick film 205.

FIG. 19(d) is a view showing the manufacturing step ST15-4.

Next, in the manufacturing step ST15-4 (UV exposure via photo mask), the positive resist is subjected to UV irradiation F via photo mask 207 having the pattern of the seal material formed thereon.

FIG. 19(e) is a view showing the manufacturing step ST15-5.

Next, in the manufacturing step ST15-5 (etching of positive resist), the positive resist 207 is subjected to etching such that the exposed portion becomes a mask for forming wall shaped structures (pillar shaped structures or void structures in the case of liquid crystal device 3 or 4).

FIG. 19(f) is a view showing the manufacturing step ST15-6.

Next, in the manufacturing step ST15-6 (ion milling), the gold thick film 205 is half-etched to form wall shaped structures (pillar shaped structures or void structures in the case of liquid crystal device 3 or 4) on the surface of the gold thick film.

FIG. 20(a) is a view showing the manufacturing step ST15-7.

Next, in the manufacturing step ST15-7 (removal of positive resist), the positive resist 207 is removed in order to half-etch the gold thick film 205.

FIG. 20(b) is a view showing the manufacturing step ST15-8.

Next, in the manufacturing step ST15-8 (application of positive resist), in order to form the frame shaped pattern of the seal material by photolithography, the positive resist 209 is applied to the gold thick film 205.

FIG. 20(c) is a view showing the manufacturing step ST15-9.

Next, in the manufacturing step ST15-9 (UV exposure via photo mask), the positive resist 209 is subjected to UV irradiation F via the mask 210 having the pattern of the seal material formed thereon.

FIG. 20(d) is a view showing the manufacturing step ST15-10.

Next, in the manufacturing step ST15-10 (etching of positive resist), the positive resist 209 is etched such that exposed portion becomes the mask for forming the pattern of the seal material in subsequent manufacturing steps.

FIG. 20(e) is a view showing the manufacturing step ST15-11.

Next, in the manufacturing step ST15-11 (etching), the gold thick film 205 is removed by wet etching with the positive resist as a mask. Then, with the positive resist as a mask, Ti film 204 and the inorganic spacer material 203 consisting of $SiO_2$ are removed by reactive ion etching (RIE).

FIG. 20(f) is a view showing the manufacturing step ST15-12.

Next, in the manufacturing step ST15-12 (removal of positive resist), the positive resist is removed.

FIG. 21(a) is a view showing the manufacturing step ST15-13.

Next, in the manufacturing step ST15-13 (oblique deposition of $SiO_2$), oblique deposition of $SiO_2$ 212 is performed in order to control alignment direction of the liquid crystal layer. By deposition, $SiO_2$ 212 is also formed on the wall structures (pillar shaped structures or void structures in the case of liquid crystal device 3 or 4) on the surface of the gold thick film 205.

FIG. 21(b) is a view showing the manufacturing step ST15-14.

Next, in the manufacturing step ST15-14 (application of positive resist), in order to remove $SiO_2$ layer 212 formed on the gold thick film 205 by etching, positive resist 213 is applied.

FIG. 21(c) is a view showing the manufacturing step ST15-15.

Next, in the manufacturing step ST15-15 (UV exposure via photo mask), the positive resist 213 is subjected to UV irradiation F via a mask 214 having a prescribed pattern formed.

FIG. 21(d) is a view showing the manufacturing step ST15-16.

Next, in the manufacturing step ST15-16 (etching of positive resist), the positive resist 213 is etched such that the exposed portion becomes a mask.

FIG. 21(e) is a view showing the manufacturing step ST15-17.

Next, in the manufacturing step ST15-17 (RIE etching), $SiO_2$ layer 212 on the gold thick film 205 is removed by reactive ion etching (RIE) with the positive resist 213 as a mask.

FIG. 21(f) is a view showing the manufacturing step ST15-18.

Next, in the manufacturing step ST15-18 (removal of positive resist), the positive resist 213 is removed. Then, residual resist on the alignment film 213 is removed by $O_2$ plasma ashing.

As has been described above, in the first seal material forming process (5), known photolithography technology is used to form inorganic shield material on the glass substrate and structures on the gold thick film to thereby form the first seal material 31 on the first substrate body 10.

Still another first seal material forming process (6) will be described below.

The still another first seal material forming process (6) is a process different from the first seal material forming process (1) shown in FIGS. 10-12. In the still another first seal material forming process (6), the gold thick film is removed by lift-off.

Figure 22:
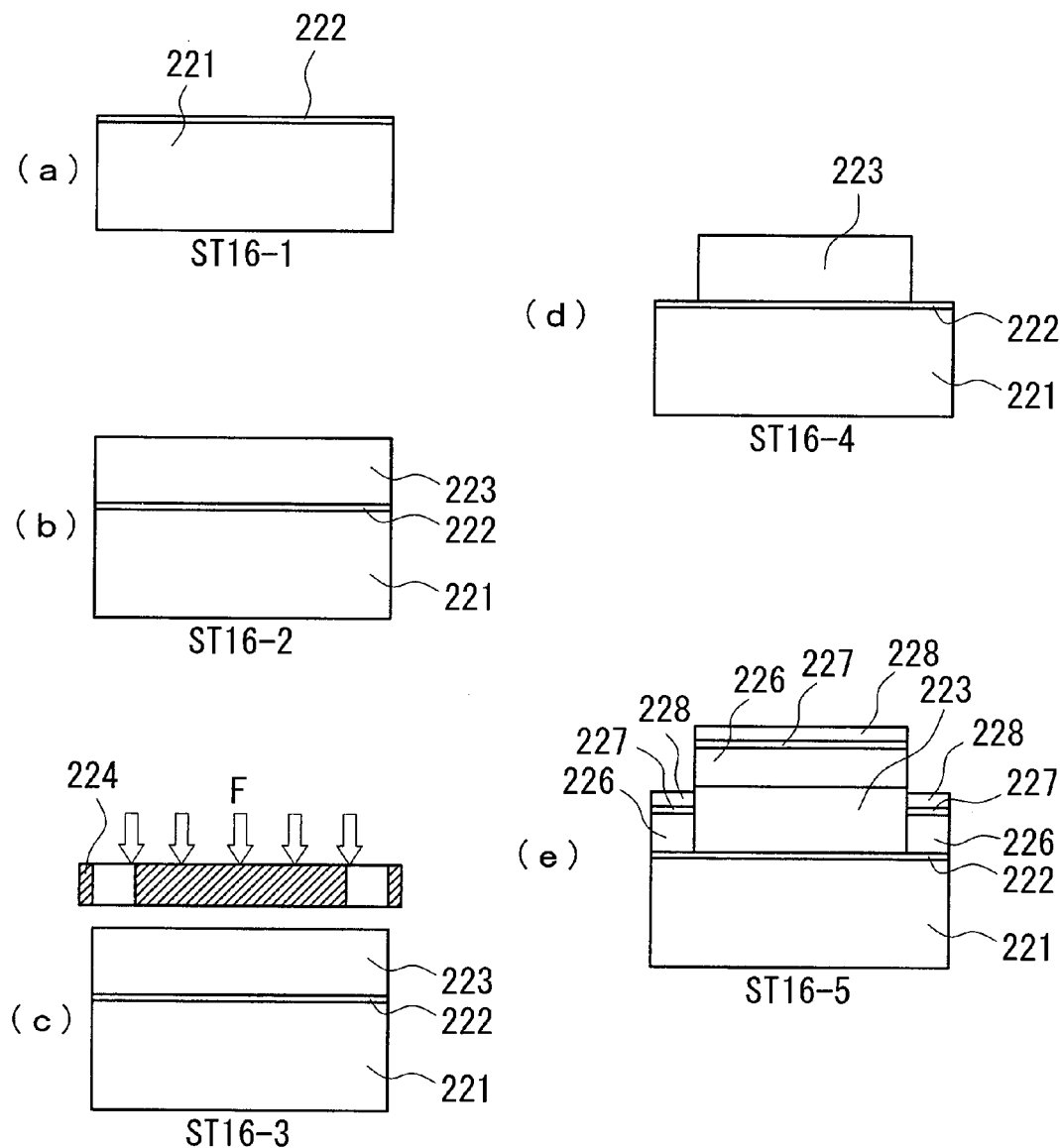
FIGS. 22($a$)~($e$) are process drawings (1) useful for explaining still another first seal material forming process (6)
Figure 23:
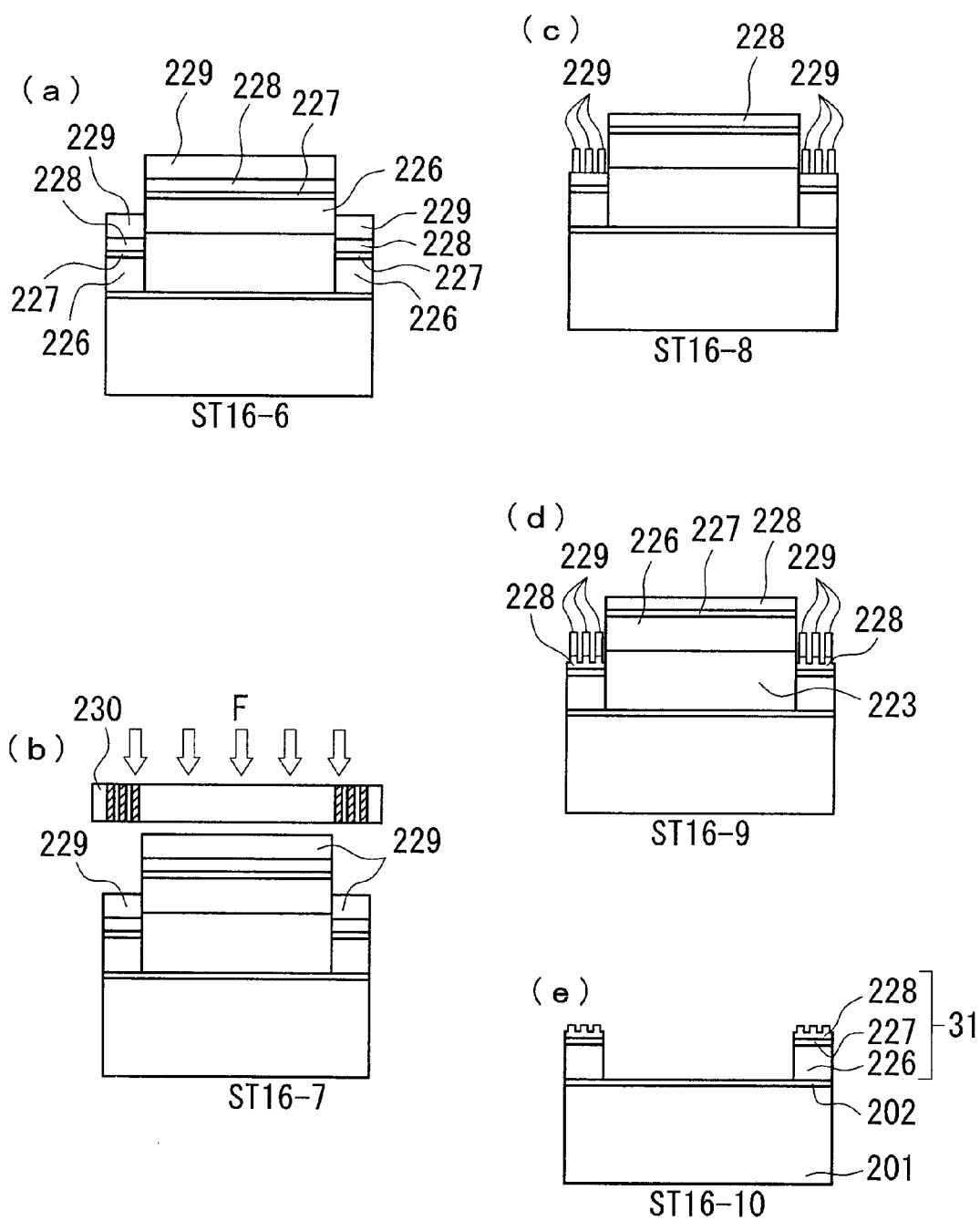
FIGS. 23($a$)~($e$) are process drawings (2) useful for explaining still another first seal material forming process (6)

FIGS. 22 and 23 are process drawings useful for explaining the still another first seal material forming process (6). In each of the drawings, same constituents are denoted by same reference numerals, and duplicated explanation thereof is omitted. The still another first seal material forming process (6) shown in FIGS. 22 and 23 can be adopted in the manufacturing step of liquid crystal device 1 in place of the first seal material forming process (1) shown in FIG. 9.

The manufacturing step ST16-20 and subsequent steps in the still another first seal material forming process (6) are common to the manufacturing step ST15-13~ST15-18 shown in FIG. 21 included in another first seal material forming process (5), and therefore, explanation thereof is omitted.

FIG. 22 (a) is a view showing the manufacturing step ST16-1.

In the manufacturing step ST16-1 (providing ITO substrate), an opposing electrode 222 consisting of ITO is formed on the glass substrate as the first substrate 221.

FIG. 22 (b) is a view showing the manufacturing step ST16-2.

Next, in the manufacturing step ST16-2 (application of positive resist), in order to form the pattern of the seal material by photolithography, positive resist 223 is applied onto the opposing electrode 222.

FIG. 22 (c) is a view showing the manufacturing step ST16-3.

Next, in the manufacturing step ST16-3 (UV exposure via photo mask), the positive resist 223 is subjected to UV irradiation F via the mask 224 having the pattern of the seal material formed.

FIG. 22 (d) is a view showing the manufacturing step ST16-4.

Next, in the manufacturing step ST16-4 (etching of positive resist), the positive resist is etched such that the exposed portion becomes a prescribed mask.

FIG. 22 (e) is a view showing the manufacturing step ST16-5.

Next, in the manufacturing step ST16-5 (TEOS, coating of Ti, gold in this order), $SiO_2$ as inorganic spacer material 226 is formed as basis of the seal material by TEOS on the opposing electrode 202 of the first substrate 201 and on the mask 223. Thereafter, Ti film 227, and the gold thick film 228 on top of it are formed by deposition. In this manufacturing step as the first spacer forming step, Ti film 227 is formed so as to increase close adhesion of the inorganic spacer material 226 consisting of $SiO_2$ and the gold thick film 228, and at the same time, thickness of the liquid crystal layer can be determined from the thickness of the inorganic spacer material 226, Ti film 227 and the gold thick film 228.

FIG. 23(a) is a view showing the manufacturing step ST16-6.

Next, in the manufacturing step ST16-6 (application of positive resist), in order to form the frame shaped pattern of the seal material by photolithography, the positive resist 229 is applied to the gold thick film 228.

FIG. 23(b) is a view showing the manufacturing step ST16-7.

Next, in the manufacturing step ST16-7 (UV exposure via photo mask), the positive resist 229 is subjected to UV irradiation F via the mask 230 having the pattern of the seal material formed thereon.

FIG. 23(c) is a view showing the manufacturing step ST16-8.

Next, in the manufacturing step ST16-8 (etching of positive resist), the positive resist 229 is etched such that exposed portion becomes the mask for forming the wall shaped structures (pillar shaped structures or void structures in the case of liquid crystal device 3 or 4) in subsequent manufacturing steps.

FIG. 23(d) is a view showing the manufacturing step ST16-9.

Next, in the manufacturing step ST16-9 (ion milling), the gold thick film 228 is half-etched with the positive resist 229 as a mask to form the wall shaped structures (pillar shaped structures or void structures in the case of liquid crystal device 3 or 4).

FIG. 23(e) is a view showing the manufacturing step ST16-10.

Next, in the manufacturing step ST16-10 (removal of positive resist), the positive resist 229 on the gold thick film 228 is removed. Together with the positive resist 223, the inorganic spacer material 226, Ti film 227, and the gold thick film 228 formed on top of it are lifted-off. Since it may be difficult to remove the gold thick film 228 formed in the region other than the seal material 31 by wet etching, the positive resist 223 formed under the gold thick film 228 is lifted-off in the present process so as to be able to remove the gold thick film 228 easily.

The oblique deposition of $SiO_2$ layer 212 and the removal of $SiO_2$ layer 212 on the gold thick film 228 are common to the manufacturing step ST15-13~manufacturing step ST15-18 shown in FIG. 21 included in another first seal material forming process (5), and therefore, explanation thereof is omitted. Thus, ultimately, the first seal material 31 on the first substrate body 10 shown in FIG. 21(f) is formed.

Now, various second seal forming processes will be described below.

The second seal material forming process (1) shown in FIG. 9 will be described with reference to FIGS. 24 and 25. In each of the drawings, same constituents are denoted by same reference numerals, and duplicated description thereof will be omitted.

FIG. 24(a) is a view showing the manufacturing step ST 21-1.

In the manufacturing step ST 21-1 (providing Si substrate), the second substrate 21 consisting of silicon substrate has a layer formed with CMOS circuit 22, an aluminum electrode forming the pixel electrode 23, and a passivation film 24 for protecting them formed thereon.

FIG. 24(b) is a view showing the manufacturing step ST 21-2.

Next, in the manufacturing step ST 21-2 (application of negative resist), in order to form the pattern of the seal material in the seal region by photolithography, negative resist is applied to the second substrate 21 having CMOS, pixel electrode and the passivation film formed thereon.

FIG. 24(c) is a view showing the manufacturing step ST 21-3.

Next, in the manufacturing step ST 21-3 (UV exposure via photo mask), the negative resist is subjected to UV irradiation F via the mask 81 having the pattern of the seal material formed thereon.

FIG. 24(d) is a view showing the manufacturing step ST 21-4.

Next, in the manufacturing step ST 21-4 (etching of negative resist), the negative resist 72 in the region for forming alignment film is removed by etching.

FIG. 24(e) is a view showing the manufacturing step ST 21-5.

Next, in the manufacturing step ST 21-5 (coating of alignment film), $SiO_2$ is coated by oblique deposition onto the negative resist 72 and on the surface of the passivation film 24 in the region of the pixel electrode 23.

FIG. 24(f) is a view showing the manufacturing step ST 21-6.

Next, in the manufacturing step ST 21-6 (lift-off), the negative resist is removed, and $SiO_2$ of the alignment film 25 deposited on the negative resist is thereby removed, too.

FIG. 25(a) is a view showing the manufacturing step ST 21-7.

Next, in the manufacturing step ST 21-7 (application of negative resist), the negative resist 72 for forming the seal material is applied.

FIG. 25(a) is a view showing the manufacturing step ST 21-8.

Next, in the manufacturing step ST 21-8 (UV exposure via photo mask), in order to form the mask of negative resist 72 in the alignment film 25, UV exposure F is performed via the mask 83.

FIG. 25(b) is a view showing the manufacturing step ST 21-9.

Next, in the manufacturing step ST 21-9 (etching of negative resist), the mask of the negative resist 72 is formed on the alignment film 25, and the negative resist 72 is removed by etching in the portion forming the seal material.

FIG. 25(c) is a view showing the manufacturing step ST 21-10.

Next, in the manufacturing step ST 21-10 (coating of Ti film and the gold film), the inorganic spacer material consisting of Ti film 37 and gold film 36 are coated in the region for forming the seal material and on the surface of the negative resist 72. This manufacturing step is comprised as the second spacer forming step in order for Ti film 37 to increase secure and close adhesion of the gold film 36 and the silicon substrate. Ti film 37 may be Cr film.

FIG. 25(d) is a view showing the manufacturing step ST 21-11.

Next, in the manufacturing step ST 21-11 (lift-off), the negative resist 72 is removed, and Ti film 37 and the gold film 36 formed on the surface of the negative resist 72 are also removed (lift-off), so that the second substrate body 20 is formed from the second substrate 21 having the seal material 32 (Ti film 37 and gold film 36) formed thereon.

As has been described above, in the second seal material forming process (1), as in the manufacturing step of the first substrate body 10, known lithography technology is used to form inorganic shield material and gold film on a silicon substrate to form the second substrate body 20.

Another second seal material forming process (2) will be described below.

Figure 24:
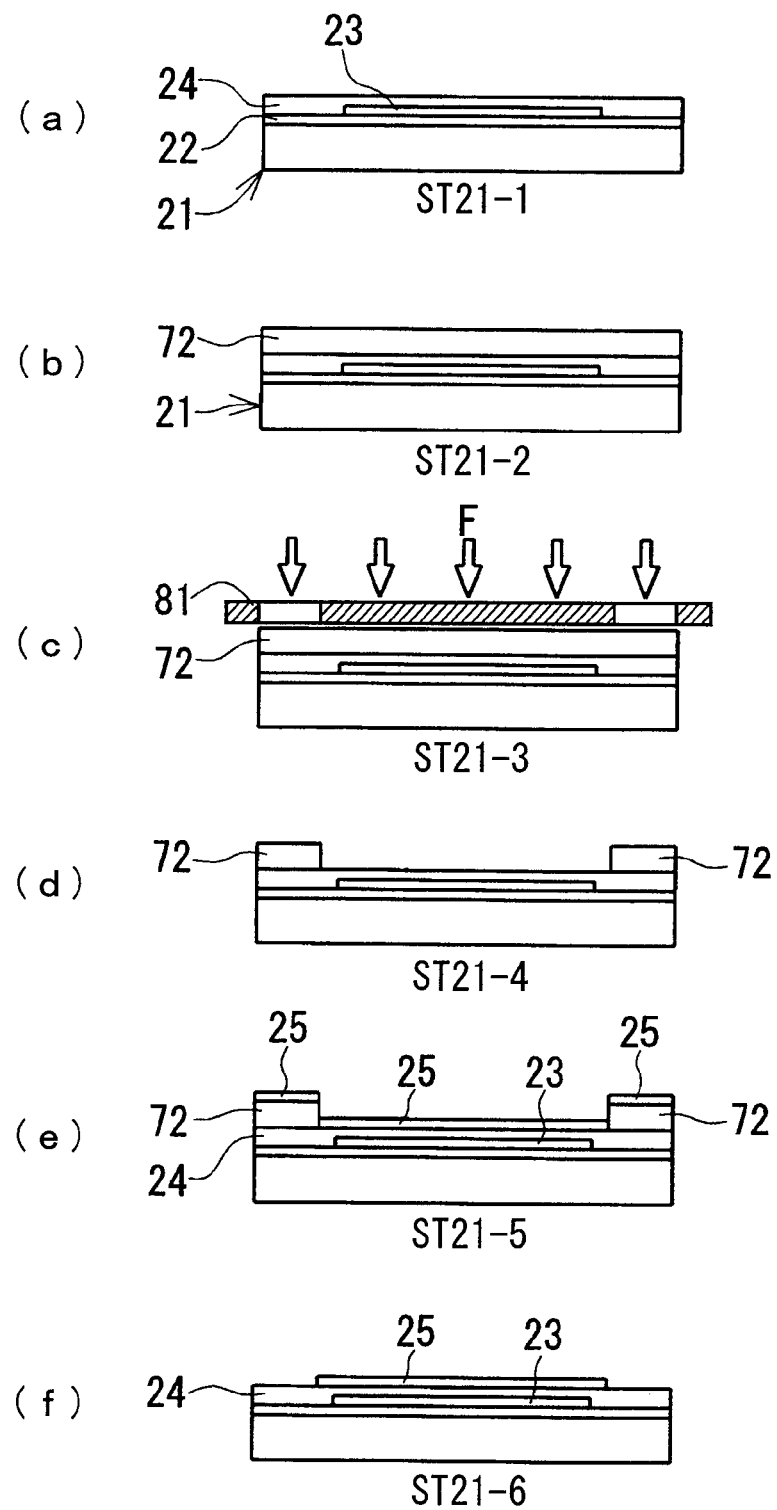
FIGS. 24($a$)~($f$) are process drawings (1) useful for explaining a second seal material forming process (1)
Figure 25:
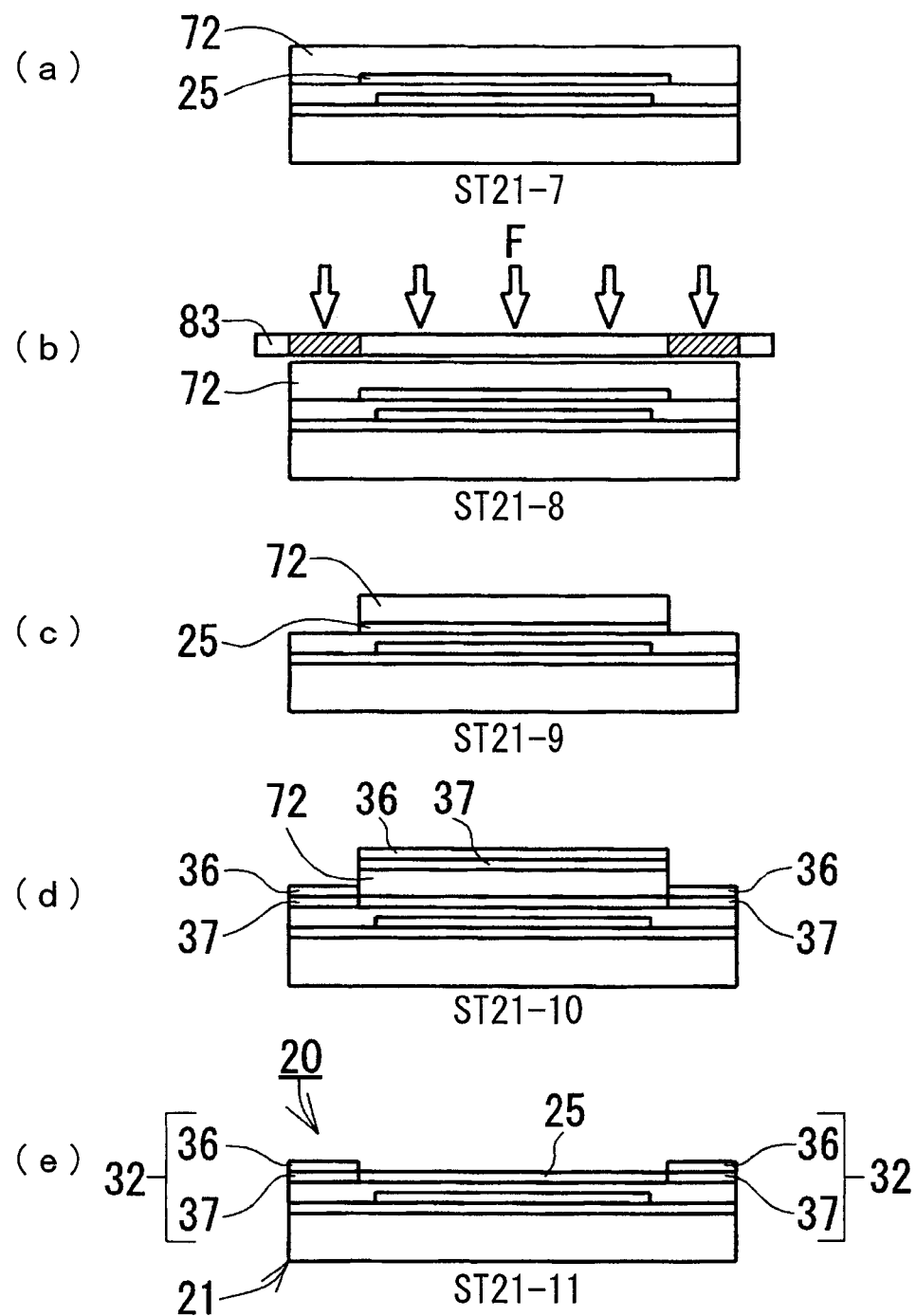
FIGS. 25($a$)~($e$) are process drawings (2) useful for explaining a second seal material forming process (1)

Another second seal material forming process (2) is a process different from the second seal material forming process (1) shown in FIGS. 24 and 25. In another second seal material forming process (2), a metal mask is used to coat an alignment film consisting of $SiO_2$ in oblique deposition to thereby reduce the number of steps.

Figure 26:
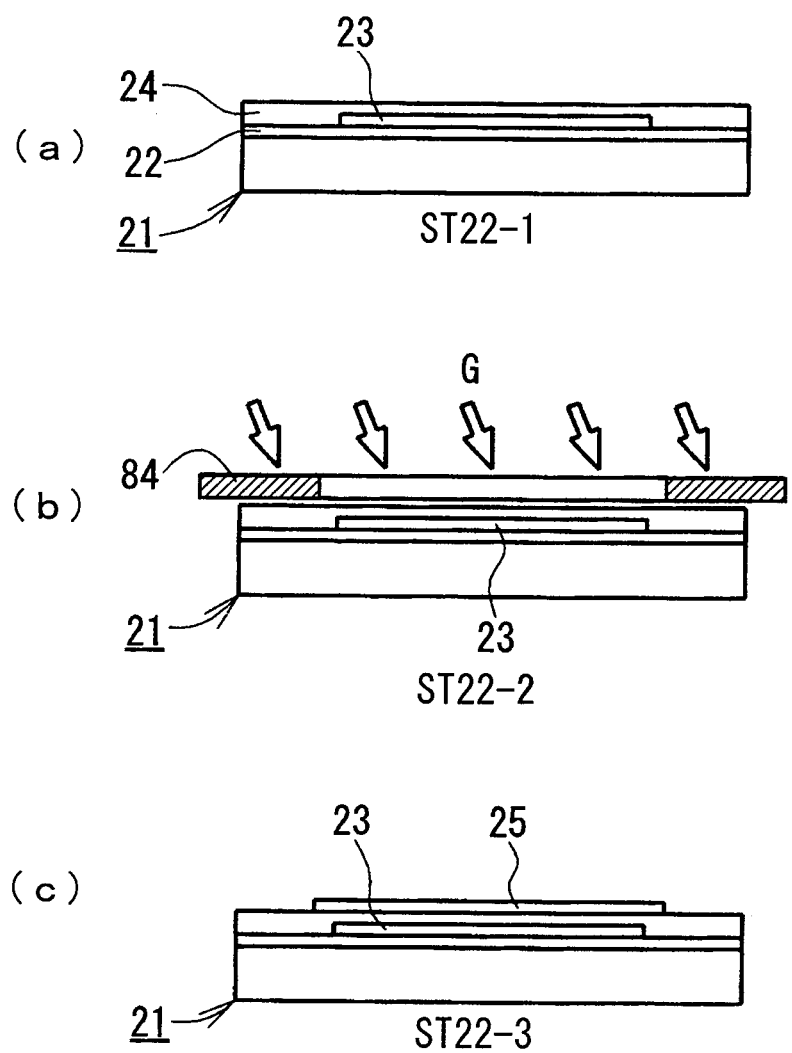
FIGS. 26($a$)~($c$) are process drawings useful for explaining another second seal material forming process (2)

FIG. 26 is a process drawing useful for explaining another second seal material forming process (2). In each of the drawings, same constituents are denoted by same reference numerals, and duplicated explanation is omitted. Another second seal material forming process (2) can be adopted in manufacturing step of the liquid crystal device 1 in place of the second seal material forming process (1) shown in FIG. 9.

ST22-3 and subsequent steps in the second seal material forming process (2) are common to the manufacturing steps ST21-6-ST21-11, and therefore, explanation thereof is omitted.

FIG. 26(a) is a view showing the manufacturing step ST22-1.

In the manufacturing step ST22-1 (providing Si wafer), the second substrate 21 consisting of silicon substrate has an aluminum electrode forming the pixel electrode 23, and the passivation film 24 for protecting it formed thereon.

FIG. 26(b) is a view showing the manufacturing step ST22-2.

In the manufacturing step ST22-2 (coating alignment film via metal mask), in order to coat an alignment film consisting of $SiO_2$ in the region of the pixel electrode 23 of the second substrate 21, the metal mask is set and the alignment film is coated by oblique deposition in the alignment film deposition apparatus.

FIG. 26(c) is a view showing the manufacturing step ST22-3.

In the manufacturing step ST22-3 ($SiO_2$ patterning of substrate), in the region of the pixel electrode 23 of the second substrate 21, the alignment film 25 consisting of $SiO_2$ is coated. This manufacturing step is identical to the manufacturing step ST21-6 shown in FIG. 24, and with subsequent steps also identical to the manufacturing steps of the second seal material forming process, the second substrate body 20 is formed.

As has been described above, in another second seal material forming process shown in FIG. 26, in place of the manufacturing steps of application of negative resist, exposure to light, etching, removal in the second seal material forming process shown in FIGS. 24 and 25, the manufacturing step of coating alignment film using a metal mask can be used for coating an alignment film 25 on the second substrate 21. Thus, number of manufacturing steps can be reduced, and cost can be thereby reduced.

Still another second seal material forming process (3) will be described.

The still another second seal material forming process (3) is a process different from the second seal material forming process (1) shown in FIGS. 24 and 25. In the still another second seal material forming process (3), the gold film is used as the shield to etch the alignment film consisting of $SiO_2$, and thus, it is possible to provide the manufacturing step of coating an alignment film on the second substrate with no negative resist attached thereto in an alignment film deposition apparatus.

Figure 27:
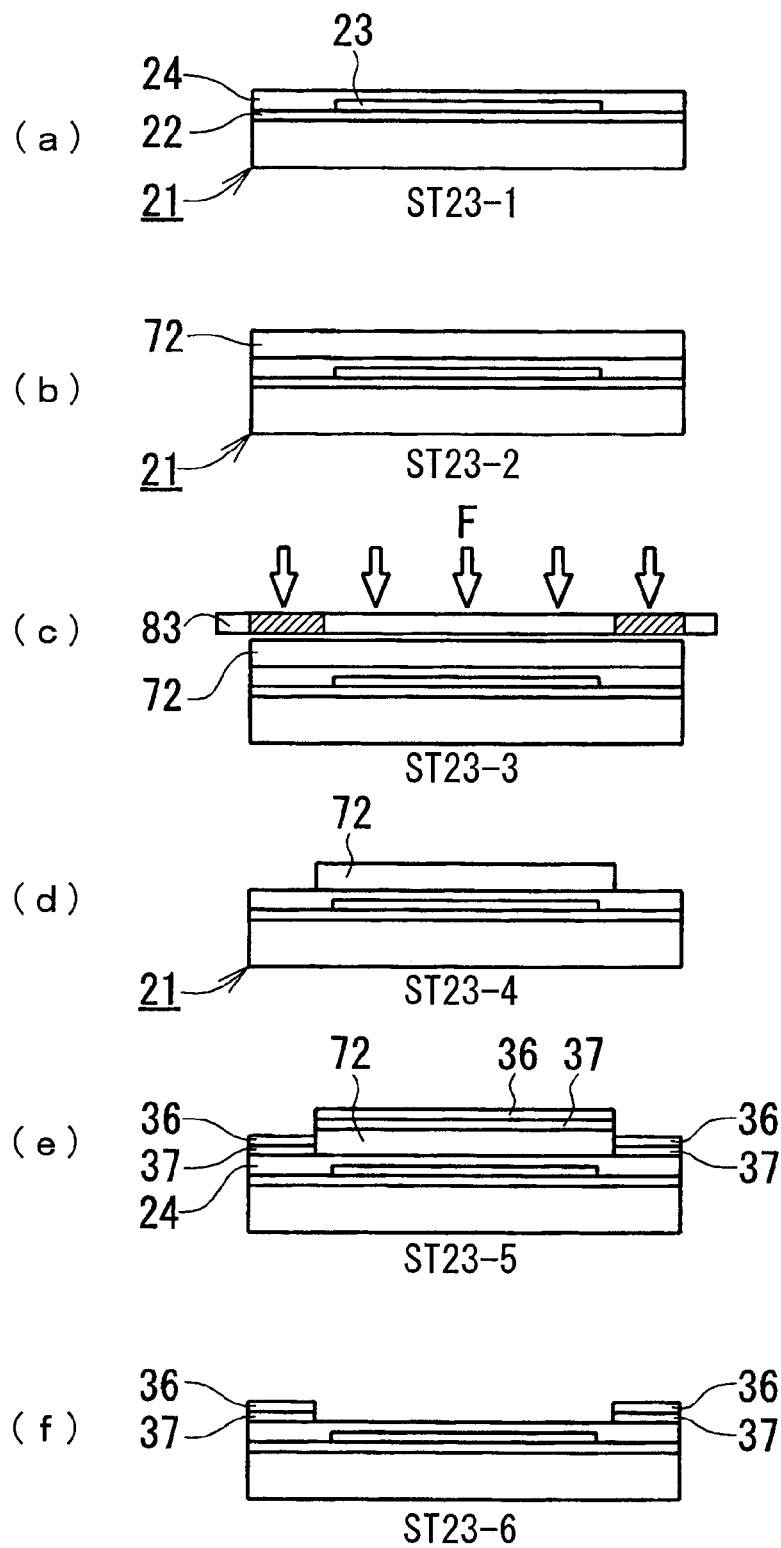
FIGS. 27($a$)~($f$) are process drawings (1) useful for explaining still another second seal material forming process (3)
Figure 28:
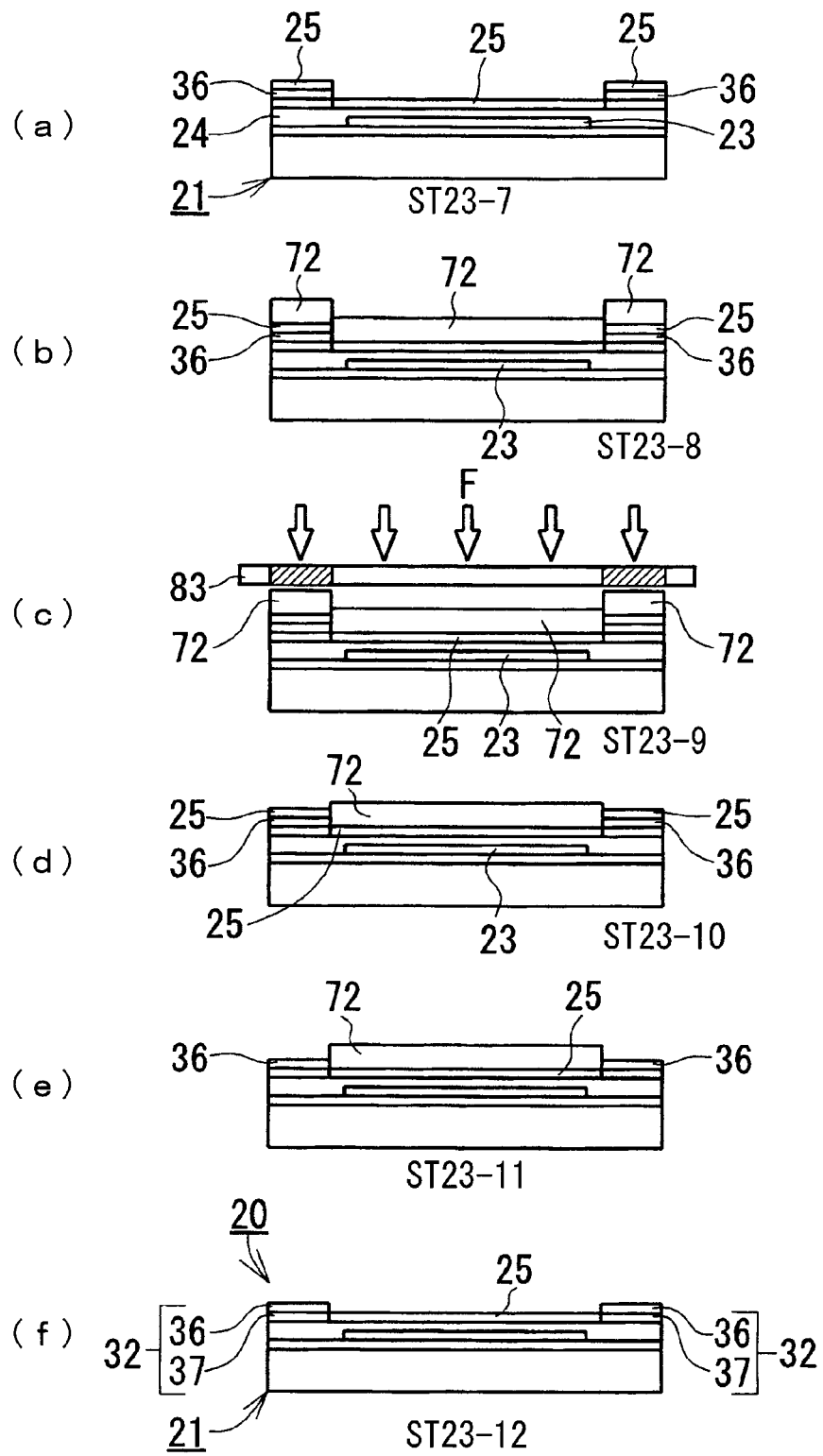
FIGS. 28($a$)~($f$) are process drawings (2) useful for explaining still another second seal material forming process (3)

FIGS. 27 and 28 are process drawings useful for explaining still another second seal material forming process (3). In each of the drawings, same constituents are denoted by same reference numerals, and duplicated explanation thereof is omitted. The still another second seal material forming process (3) can be adopted in manufacturing step of the liquid crystal device 1 in place of the second seal material forming process (1) shown in FIG. 9.

FIG. 27(a) is a view showing the manufacturing step ST23-1.

In the manufacturing step ST23-1 (providing Si wafer), the second substrate 21 consisting of a silicon substrate has a layer having CMOS circuit 22 formed therein, an aluminum electrode forming the pixel electrode 23, and a passivation film 24 for protecting them formed thereon.

FIG. 27(b) is a view showing the manufacturing step ST23-2.

In the manufacturing step ST23-2 (application of negative resist), negative resist 72 for forming the pattern of the seal material by photolithography is applied to the second substrate 21 having CMOS circuit, the pixel electrode and the passivation film formed thereon.

FIG. 27(c) is a view showing the manufacturing step ST23-3.

Next, in the manufacturing step ST23-3 (UV exposure via photo mask), the negative resist 72 is subjected to UV irradiation F via a photo mask having the pattern of the seal material formed therein.

FIG. 27(d) is a view showing the manufacturing step ST23-4.

Next, in the manufacturing step ST23-4 (etching of negative resist), the negative resist in the region for forming the seal material is removed by etching.

FIG. 27(e) is a view showing the manufacturing step ST23-5.

Next, in the manufacturing step ST23-5 (coating of Ti film, gold film), Ti film 37 and gold film 36 are coated on the negative resist 72 and the surface of the passivation film 24 in the seal material forming region. This manufacturing step is provided in the second spacer forming process as a manufacturing step for Ti film 37 to ensure close adhesion between the gold film 36 and the silicon substrate. Ti film 37 may be Cr film.

FIG. 27(f) is a view showing the manufacturing step ST23-6.

Next, in the manufacturing step ST23-6 (lift-off), the negative resist 72 is removed, and the gold film 36 and Ti film 37 having been deposited on the negative resist 72 are also removed. Therefore, the gold film 36 and Ti film 37 in the seal material forming region are left.

FIG. 28(*a*) is a view showing the manufacturing step ST23-7.

Next, in the manufacturing step ST23-7 (coating of alignment film), the second substrate 21 having the negative resist removed is loaded into an alignment film deposition apparatus, and an alignment film 25 consisting of $SiO_2$ is coated by oblique deposition to the surface of the passivation film 24 in the region of the pixel electrode 23 and gold film 36 in the region of the seal material.

FIG. 28(*b*) is a view showing the manufacturing step ST23-8.

Next, in the manufacturing step ST23-8 (application of negative resist), negative resist 72 is applied as a preliminary step for removing the alignment film 25 coated on the surface of the gold film 36 and masking the alignment film 25 in the region of the pixel electrode 23.

FIG. 28(*c*) is a view showing the manufacturing step ST23-9.

Next, in the manufacturing step ST23-9 (UV exposure via photo mask), in order to form a mask for the negative resist in the region of the pixel electrode 23, UV exposure is performed via a mask 83.

FIG. 28(*d*) is a view showing the manufacturing step ST23-10.

Next, in the manufacturing step ST23-10 (etching of negative resist), a mask of negative resist 72 is formed on the alignment film 25 in the region of pixel electrode 23, and the negative resist is etched in preparation for removing the alignment film 25 on the gold film 36. The negative resist on the alignment film 25 of the gold film 36 is removed.

FIG. 28(*e*) is a view showing the manufacturing step ST23-11.

Next, in the manufacturing step ST23-11 (etching of $SiO_2$ with the gold as stopper), the alignment film 25 consisting of $SiO_2$ is removed by RIE with the gold film 36 as stopper. The alignment film 25 masked by the negative resist is left as it is.

FIG. 28(*f*) is a view showing the manufacturing step ST23-12.

Next, in the manufacturing step ST23-12 (removal of negative resist), the negative resist 72 is removed, and thereafter, the residual negative resist on the alignment film 13 is removed by $O_2$ plasma ashing to expose the alignment film 25 in the region of pixel electrode 23. Thus, the second substrate body 20 having the seal material 31 (Ti film 37 and the gold film 36) and the alignment film 25 formed on the second substrate 21 is formed.

As has been described above, in the still another second seal material forming process shown in FIGS. 27 and 28, the second substrate body 20 is formed by the manufacturing steps that do not contaminate the alignment film deposition apparatus with negative resist.

Still another second seal material forming process (4) will be described below.

The still another second seal material forming process (4) is a process different from the second seal material forming process (1) shown in FIGS. 24 and 25. In the still another second seal material forming process (4), the resist does not come into contact with the surface of the second substrate 21 consisting of silicon substrate until the manufacturing step of coating an alignment film.

Figure 29:
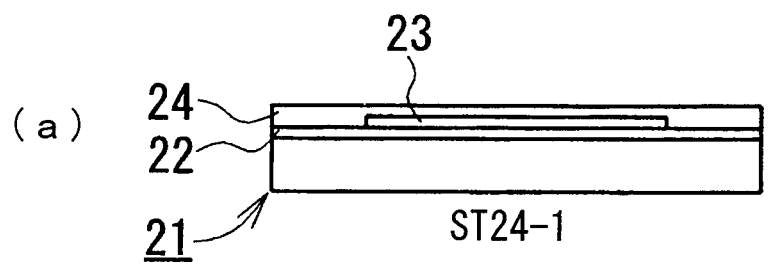
FIGS. 29($a$)~($d$) are process drawings (1) useful for explaining still another second seal material forming process (4)
Figure 29:
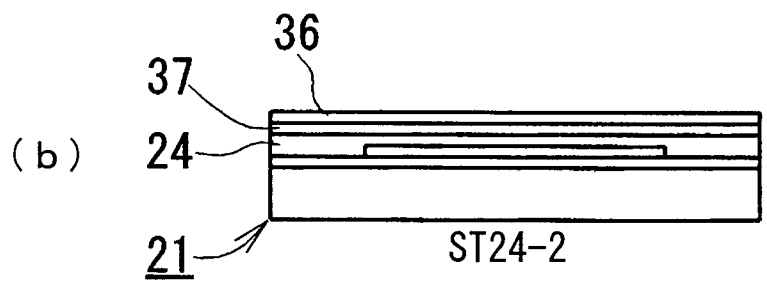
Figure 29:
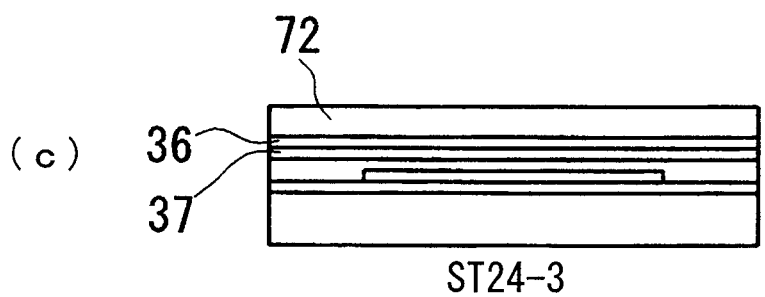
Figure 29:
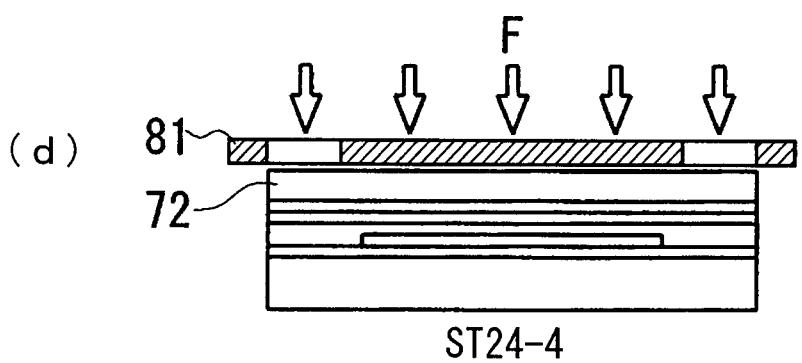
Figure 30:
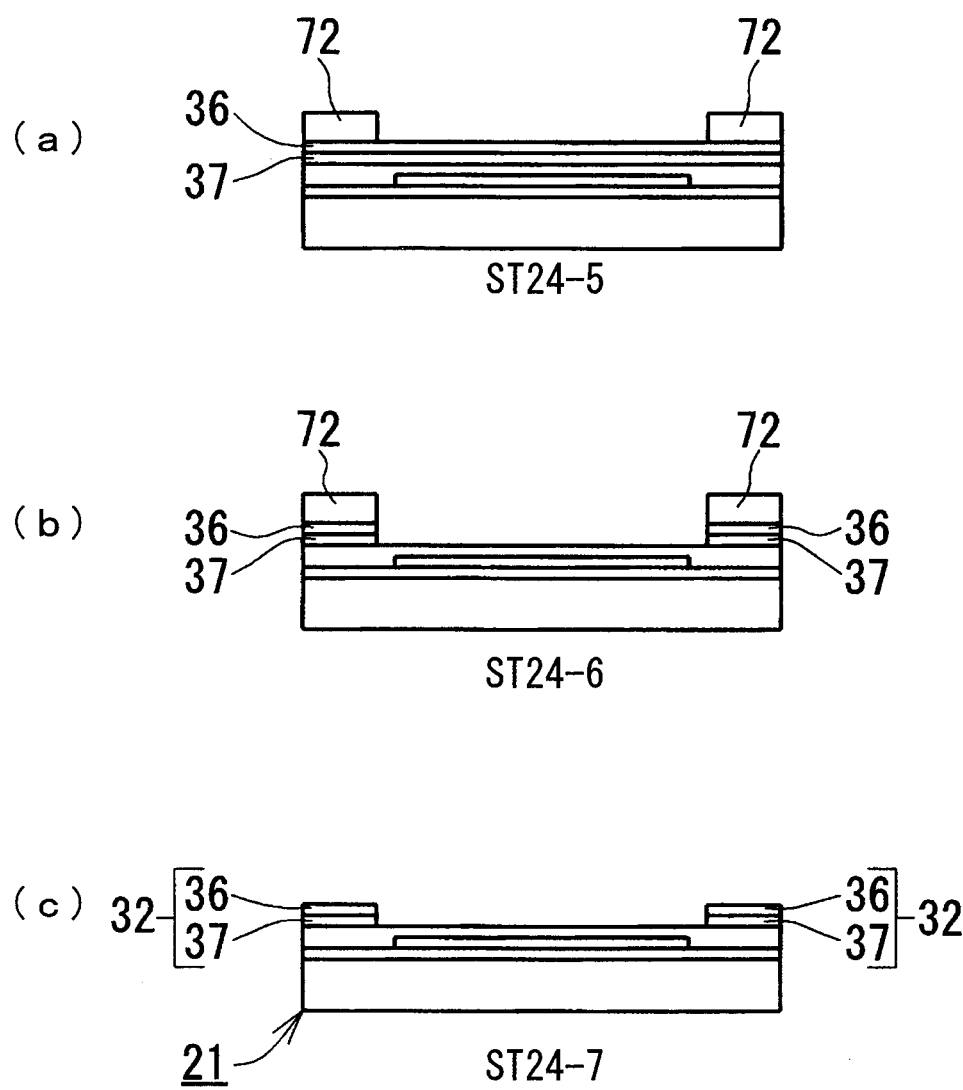
FIGS. 30($a$)~($c$) are process drawings (2) useful for explaining still another second seal material forming process (4)

FIGS. 29 and 30 are process drawings useful for explaining the still another second seal material forming process (4). In each of the drawings, same constituents are denoted by same reference numerals, and duplicated explanation thereof is omitted. The still another second seal material forming process (4) can be adopted in the manufacturing step of the liquid crystal device 1 in place of the second seal material forming process (1) shown in FIG. 9.

FIG. 29(*a*) is a view showing the manufacturing step ST24-1.

In the manufacturing step ST24-1 (providing Si wafer), the second substrate 21 consisting of a silicon substrate has a layer having CMOS circuit 22 formed therein, an aluminum electrode forming the pixel electrode 23, and a passivation film 24 for protecting them formed thereon.

FIG. 29(*b*) is a view showing the manufacturing step ST24-2.

In the manufacturing step ST24-2 (coating of Ti film, gold film), Ti film 37 and the gold film 36 are coated on the surface of the passivation film 24 of the second substrate 21. This manufacturing step is provided in the second spacer forming process as a manufacturing step for Ti film 37 to ensure close adhesion between the gold film 36 and the silicon substrate. Ti film 37 may be Cr film.

FIG. 29(*c*) is a view showing the manufacturing step ST24-3.

Next, in the manufacturing step ST24-3 (application of negative resist), in order to form the pattern of the frame shaped seal material, the negative resist 72 is applied to the gold thick film 36.

FIG. 29(*d*) is a view showing the manufacturing step ST24-4.

Next, in the manufacturing step ST24-4 (UV exposure via photo mask), the negative resist 72 is subjected to UV irradiation F via the mask 81 formed with the pattern of the seal material.

FIG. 30(*a*) is a view showing the manufacturing step ST24-5.

Next, in the manufacturing step ST24-5 (etching of negative resist), the negative resist 72 is etched such that the portion exposed and left after etching can serve as a mask for forming the seal material in subsequent manufacturing steps.

FIG. 30(*b*) is a view showing the manufacturing step ST24-6.

Next, in the manufacturing step ST24-6 (etching of Ti film, gold film), in order to form the seal material, the portion of Ti film 37 the gold thick film 36 not masked by the negative resist 72 is removed by etching or the like.

FIG. 30(*c*) is a view showing the manufacturing step ST24-7.

Next, in the manufacturing step ST24-7 (removal of negative resist), the negative resist 72 is removed and the gold film 36 of the seal material is exposed. Thus, the seal material 32 (Ti film 37 and gold film 36) is formed on the second substrate 21.

Subsequent manufacturing steps are manufacturing steps for coating an alignment film, and are common to the manufacturing step ST23-6 to manufacturing step ST23-12 shown in FIGS. 27 and 28, and therefore, explanation thereof is omitted.

As has been described above, in accordance with the still another second seal material forming process (4) shown in FIGS. 29 and 30, the surface of the silicon substrate does not come into contact with foreign matter such as resist before coating of an alignment film, so that the alignment film can be coated in cleaner conditions, and therefore, more homogeneous alignment film can be formed.

Still another liquid crystal device 5 will be described below.

Figure 31:
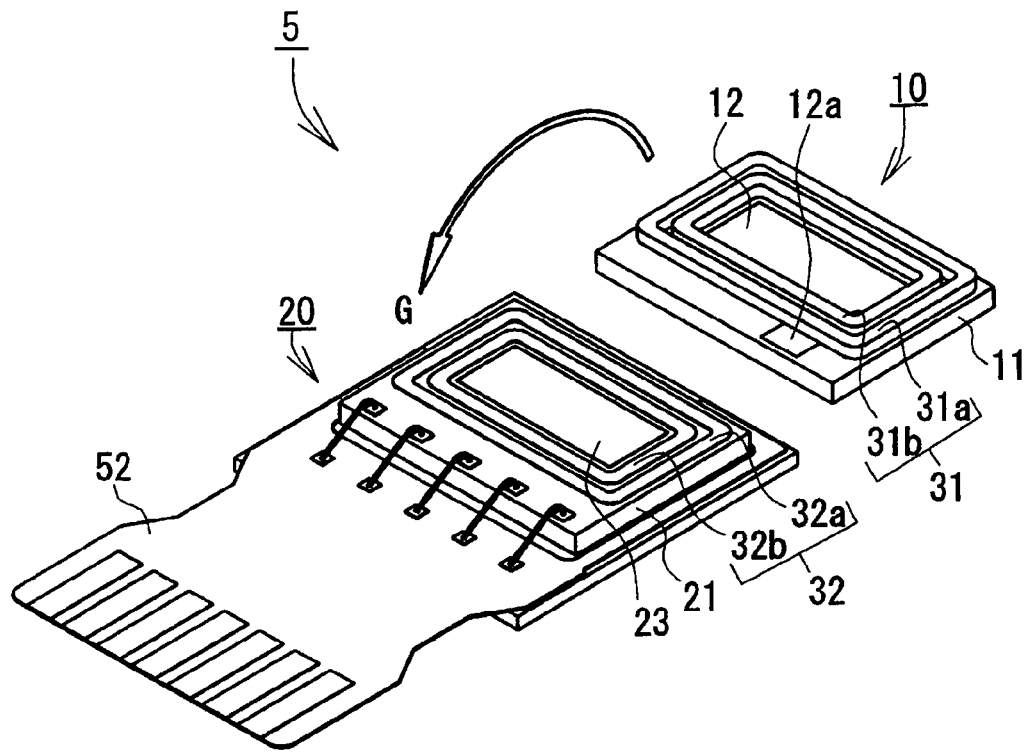
FIG. 31 is a partial exploded perspective view showing still another liquid crystal device 5.
Figure 32:
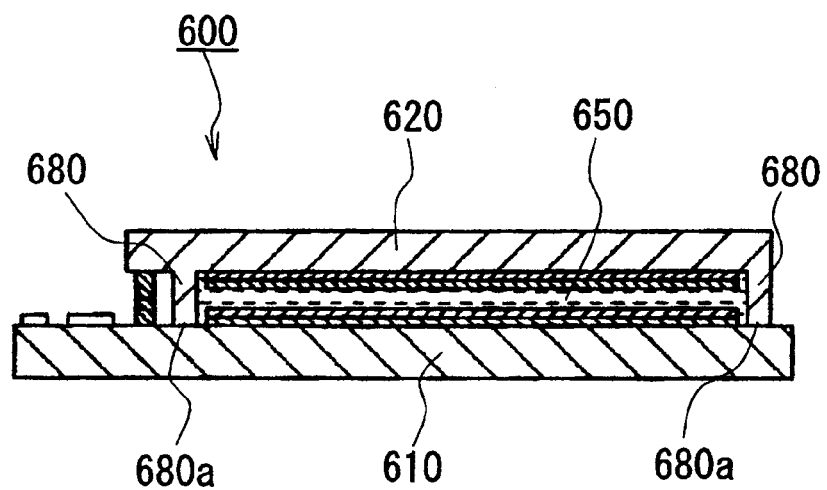
FIG. 32 is a sectional view useful for explaining prior art shown in Patent Literature 1.
Figure 33:
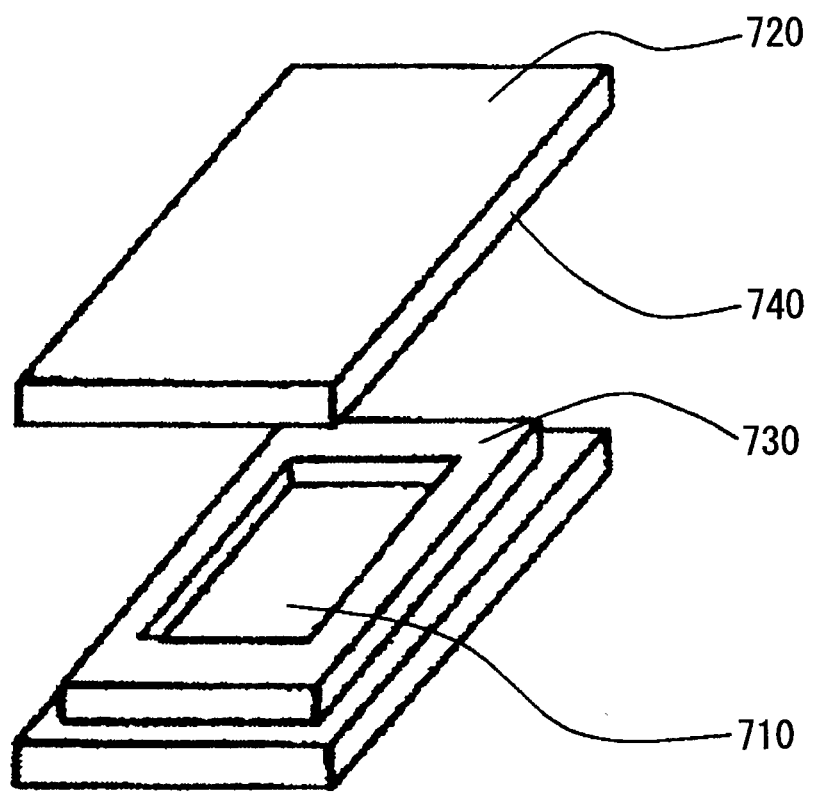
FIG. 33 is a perspective view useful for explaining prior art shown in Patent Literature 2.
Figure 34:
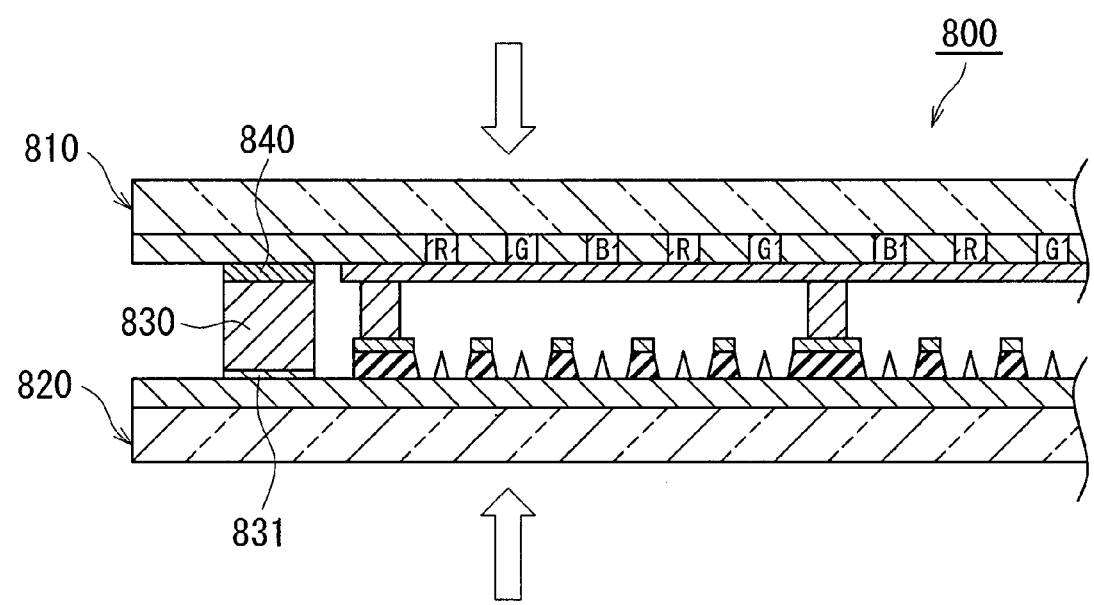
FIG. 34 is a sectional view useful for explaining prior art shown in Patent Literature 3.

FIG. 31 is a partial exploded perspective view showing still another liquid crystal device 5. In the liquid crystal device 5, the seal material is disposed in double, on the inside and on the outside, and the injection port 38 shown in FIGS. 2 and 4 and the like, is not provided. That is, method of sealing the liquid crystal layer is changed in the liquid crystal device 5. In FIG. 31, same constituents as in FIG. 2 are denoted by same reference numerals, and duplicated explanation is omitted.

As shown in FIG. 31, the first substrate body 10 has the first seal material 31 in the shape of closed double frames consisting of the first outer seal material 31*a* and the first inner seal material 31*b* formed in the seal region surrounding the opposing electrode 12 consisting of ITO on the first substrate 11. The terminal 12*a* of the opposing electrode 12 is formed so as to extend outside of the first seal material 31 and is electrically connected to an electrode (not shown) extended from FPC 52 with silver paste or the like.

The second substrate body 20 has the second seal material 32 in the shape of closed double frames consisting of the second outer seal material 32*a* and the second inner seal material 32*b* formed in the seal region surrounding the pixel electrode consisting, for example, of aluminum electrode on the second substrate 21.

The planar shapes of the second outer seal material 32*a* and the second inner seal material 32*b* are formed respectively in identical shape to the planar shapes of the first outer seal material 31*a* and the first inner seal material 31*b*. The gold thick film on the first outer seal material 31*a* and the first inner seal material 31*b* of the first substrate body 10 is formed to coincide with, and to be superimposed on so as to seal the gold thin film on the second outer seal material 32*a* and the second inner seal material 32*b*. At the time of assembly of the liquid crystal device 1, as has been described with reference to FIG. 2, the first substrate body 10 is superimposed on the second substrate body 20 in the direction of the arrow G so as to form the liquid crystal device 5.

The first double seal material 31 and the second double seal material 32 can be formed in various first seal material forming processes and the second seal material forming processes as has been described above. After these seal materials are formed, the gold surface on the surface of all the seal materials is subjected to surface activation treatment. Then, suitable quantity of liquid crystal is disposed inside the inner seal material. Thereafter, the first substrate body 10 and the second substrate body 20 are superimposed and pressurized to be joined to each other.

By adopting ODF (One Drop Fill of LCD) in which liquid crystal is injected by dripping inside the frame shaped seal material without providing injection port, sealing of injection port with resin becomes unnecessary, and more secure sealing and water-proof performance can be achieved.

The liquid crystal device 5 shown in FIG. 31 can also be manufactured in accordance with the manufacturing method shown in FIG. 9. It is to be understood that various first seal material forming processes and second seal material forming processes described above can be utilized in the manufacture.

As is evident from various first seal material forming processes for forming the first seal material 31 of the first substrate body 10 and second seal material forming processes for forming the second seal material 32 of the second substrate body 20 as described above, the seal material of the liquid crystal device can be formed from inorganic material simply by adding a few steps to the mass-production line for manufacturing ordinary liquid crystal device with no need for provision of special apparatuses. Since the gold films of the seal material, after being subjected to surface activation treatment, can be pressurized to be joined to each other at normal temperature to form a liquid crystal device, high durability in an environment at high temperature and high humidity can be achieved, and the utilization of liquid crystal device in optical communication becomes possible.

Although various liquid crystal devices and manufacturing methods have been described above, the second substrate consisting of a silicon substrate may be replaced by a glass substrate, and in such case, too, an inorganic seal material can be formed by similar manufacturing steps. In this case, since adhesion between ITO and Ti is poor, the portion of ITO that is to be coated by Ti is preferably removed by etching. Ti film may be replaced by Cr film. Further, negative resist and positive resist can be replaced by each other, and in this case, photo masks of transmission pattern and shield pattern can be used reversibly.

What is claimed is:

1. A liquid crystal device comprising:
    a first substrate provided with a frame shaped seal region for encapsulating a liquid crystal layer; and
    a second substrate provided in opposition to said first substrate;
    wherein in said seal region of said first substrate, a gold frame shaped structure is provided so as to be crushed and deformed to form metallic bond when superimposed and joined to said second substrate,
    wherein gold film is disposed in the portion of said second substrate opposed to said gold frame shaped structure to form metallic bond with said gold frame shaped structure,
    wherein an inorganic spacer material is provided between said first substrate and said gold frame shaped structure or between said second substrate and said gold film,
    wherein said inorganic spacer material controls a distance between said first substrate and said second substrate,
    wherein said gold frame shaped structure includes a multiplicity of small cells, and
    wherein said small cells exist at bonding portions between said gold film and said gold frame.

2. The liquid crystal device according to claim 1, wherein the inorganic spacer material is a dielectric film or a metal film.

3. A method of manufacturing a liquid crystal device including a first substrate, a second substrate, a seal material, and a liquid crystal layer encapsulated by said first substrate, said second substrate and said seal material, the method comprising the steps of:
    providing an inorganic spacer material on said first substrate or said second substrate so as to control a distance between said first substrate and said second substrate;
    forming a gold frame shaped structure including a multiplicity of small cells as a first seal material on said first substrate and a gold film as a second seal material on said second substrate so as to provide said inorganic spacer material between said first substrate and said gold frame shaped structure or between said second substrate and said gold film;
    subjecting the surface of the leading edges of said small cells and the surface of said gold film to surface activation treatment; and
    forming said seal material so as to join said first seal material to said second seal material by pressurizing at normal temperature said surface of the leading edges of said small cells having been subjected to the surface activation treatment and said surface of the gold film having been subjected to the surface activation treatment to form metallic bond between them.

4. The method of manufacturing a liquid crystal device according to claim 3, wherein said disposed gold film is half-etched to form said multiplicity of small cells.

5. The method of manufacturing a liquid crystal device according to claim 3, wherein said first substrate is a glass substrate and said second substrate is a silicon substrate or a glass substrate.

6. The method of manufacturing a liquid crystal device according to claim 3, wherein the surface activation treatment comprises the step of activating the surface of said multiplicity of small cells and the surface of said gold film by irradiation with plasma or on beam.

7. The method of manufacturing a liquid crystal device according to claim 3, further comprising the step of forming an alignment film on said first substrate or on said second substrate.

8. The method of manufacturing a liquid crystal device according to claim 4, wherein unnecessary portion of the gold film disposed on said first substrate is removed by lift-off in order to form said multiplicity of small cells.

* * * * *